US006023521A

United States Patent [19]
Sarpeshkar et al.

[11] Patent Number: 6,023,521
[45] Date of Patent: Feb. 8, 2000

[54] PULSE DOMAIN NEUROMORPHIC INTEGRATED CIRCUIT FOR COMPUTING MOTION

[75] Inventors: Rahul Sarpeshkar, Pasadena; Jörg Kramer, Los Angeles; Christof Koch, Pasadena, all of Calif.

[73] Assignee: California Institute of Technology, Pasadena, Calif.

[21] Appl. No.: 09/113,851

[22] Filed: Jul. 10, 1998

Related U.S. Application Data

[62] Division of application No. 08/418,287, Apr. 7, 1995, Pat. No. 5,781,648.

[51] Int. Cl.[7] ............................................. G06K 9/48
[52] U.S. Cl. ........................... 382/107; 382/199; 364/565
[58] Field of Search ........................................ 382/107, 199, 382/100; 348/155; 364/565

[56] References Cited

U.S. PATENT DOCUMENTS

| | | | |
|---|---|---|---|
| 4,658,216 | 4/1987 | Goulding et al. | 328/109 |
| 5,075,864 | 12/1991 | Sakai | 364/565 |
| 5,376,813 | 12/1994 | Delbruck et al. | 257/288 |

OTHER PUBLICATIONS

J. Tanner and C. Mead, "An Integrated Analog Optical Motion Sensor," in VSLI Signal Processing, II, S.Y. Kung, Ed., New York: IEEE Press, 1986, pp. 59–76.

T. Horiuchi, W. Bair, B. Bishofberger, J. Lazzaro and C. Koch "Computing Motion Using Analog VLSI Vision Chips: An Experimental Comparison Among Different Approaches," Int. J. Comp. Vision, vol. 8, pp. 203–216, 1992.

R.G. Benson and T. Delbrück, "Direction Selective Silicon Retina that Uses Null Inhibition," in *Advances in Neural Information Processing Systems 4*, D. S. Touretzky, Ed., San Mateo, CA: Morgan Kaufman, 1991, pp. 756–763.

T. Delbrück, "Silicon Retina with Correlation–Based, Velocity–Tuned Pixels," IEEE *Trans. on Neur. Networks*, vol. 4, pp. 529–541, 1993.

R. Sarpeshkar, W. Bair and C. Koch, "Visual Motion Computions in Analog VLSI using Pulses," in *Advances in Neural Information Processing Systems 5*, D. S. Touretzky, Ed., San Mateo, CA: Morgan Kaufman, 1993, pp. 781–788.

W. Bair and C. Koch, "An Analog VLSI Chip for Finding Edges from Zero–crossing," in *Advances in Neural Information Processing Systems 3*, R. Lippman, J. Moody, D. Touretzky, Eds., San Mateo, CA: Morgan–Kaufman, 1991, pp. 399–405.

(List continued on next page.)

*Primary Examiner*—Matthew C. Bella
*Attorney, Agent, or Firm*—Blakely, Sokoloff, Taylor & Zafman LLP

[57] ABSTRACT

An integrated circuit that computes the velocity of a visual stimulus moving between two photoreceptor locations is disclosed. In its most basic version, the circuit comprises two temporal edge detectors with photoreceptors, two pulse-shaping circuits, and one motion circuit on a single silicon chip. Velocity is computed from the signed time delay of the appearance of an image feature at the two photoreceptor locations. Specifically, each temporal edge detector detects a rapid irradiance transient at its photoreceptor location and converts it into a short current spike. This current spike is transformed into two different voltage pulses, a fast pulse and a slowly-decaying pulse, by the pulse-shaping circuit that is coupled to the temporal edge detector. The slowly-decaying voltage pulse produced at one location together with the fast voltage pulse generated at the other location, act as inputs to the motion circuit which generates a signal representative of the speed of motion for one sign or direction of motion. A pair of motion circuits encodes velocity, each motion circuit encoding speed for one of the two opposing directions of motion. The motion circuits are sample-and-hold circuits that use the fast pulse from one location to sample the slowly-decaying pulse from the other location. The individual motion-sensing cells are compact, and are therefore suited for use in dense one-dimensional or two-dimensional imaging arrays. Various embodiments are described.

6 Claims, 18 Drawing Sheets

OTHER PUBLICATIONS

Sarpeshkar, R., et al., "Visual Motion Computation in Analog VLSI Using Pulses," Advances in Neural Information Processing Systems, 1993, pp. 781–788.

Etienne Cummings, R., et al., "Real–Time 2–D Analog Motion Detector VLSI Circuit," IEEE, 1992, pp. 426–431.

Koch, C. et al., "Computing Optical Flow in Resistive Networks and in the Primate Visual System," IEEE, 1989, pp. 62–72.

Koch, C. et al., "Object–Based Analog VLSI Vision Circuits," IEEE, 1992, pp. 74–78.

Koch, C. et al., "An Adaptive Multi–Scale Approach for Estimating Optical Flow: Computational Theory and Physiological Implementation," IEE, 1992, pp. 111–122.

PULSE DOMAIN NEUROMORPHIC INTEGRATED CIRCUIT FOR COMPUTING MOTION

This application is a division, of application Ser. No. 08/418,287 filed Apr. 7, 1995, now U.S. Pat. No. 5,781,648.

The U.S. Government has certain rights in this invention pursuant to Grant No. N00014-91-J-1174 and N00014-91-J-1452 awarded by the U.S. Navy.

BACKGROUND OF THE INVENTION

1. Field of the Invention

The present invention relates generally to velocity sensors and more particularly, to compact integrated electronic circuits with velocity sensors which estimate the speed and direction of a signal stimulus moving between two photoreceptors or pixels in a one-dimensional or a two-dimensional on-chip imaging array.

2. Background of the Invention

Various applications in robotic guidance, remote sensing or vehicle control require small, fast sensors for the processing of visual motion. Robust measurement of velocity in real time is difficult but necessary if a system has to operate in dynamic environments. Parallel processing at each image location is required for handling the large volume of incoming irradiance data from the optical sensors. Ideally, the processed output should neither depend on irradiance nor on contrast. However, because physical systems are always subject to the presence of noise, the output is a function of these parameters.

Previous attempts at implementing one-dimensional and two-dimensional motion sensors can generally be divided into two main categories, namely, the gradient technique and correspondence technique. Gradient schemes extract the velocity of an image feature from the ratio of temporal and spatial derivatives of its brightness or discrete approximations thereof. Correspondence methods measure motion by comparing the positions of a spatial pattern at different times (spatial correspondence), or by comparing the times of occurrence of a temporal pattern at different positions (temporal correspondence). Digital implementations of correspondence techniques typically use the first approach, where the times of sampling are clocked and the pixel displacements of the spatial pattern between these times are variable. Most analog implementations and well-understood biological systems use the second approach, where the pixel displacements are fixed and the times of occurrence of the temporal patterns at those pixels are variable.

However, existing circuits based on either of these approaches do not provide a signal that unambiguously encodes velocity, independent of image brightness and contrast over typical ranges encountered in natural scenes. Many of these existing circuits detect edges utilizing a predetermined contrast threshold such that an edge with a contrast level that is below the threshold is disregarded, and an edge with a contrast level that is above the threshold is assumed to be a sharp edge. There are several disadvantages in explicit thresholding. First, by disregarding images with contrast levels that are below a predetermined minimum, valuable information regarding the images is lost. Second, the threshold level has to be changed if the environment or lighting changes, e.g., if one moves outdoors from an indoor environment. Thus, the scheme is not robust, is sensitive to offsets, and requires parameter values to be in exactly the right range.

Many of these existing circuits also have an output versus velocity curve that is not monotonous; the curve has a maximum at some optimal velocity and decreases on either side of the optimal velocity. Consequently, any given output that is not at the maximum, corresponds to two velocity values and is ambiguous. One such circuit is that described by T. Delbrück in *Silicon Retina with Correlation-Based, Velocity-Tuned Pixels*, IEEE TRANS. NEURAL NETWORKS, Vol. 4, p. 529–541, 1993.

An early attempt based on the gradient technique is described by J. Tanner and C. Mead, in *An Integrated Analog Optical Motion Sensor*, VLSI SIGNAL PROCESSING II, 59–76 (S. Y. Kung, Ed., IEEE Press, 1986). This circuit estimates uniform velocity in two dimensions, corresponding to global translation of a rigid object space relative to the sensor. The outputs of each pixel were made to influence the global estimates of the velocity vector components in proportion to their deviation from them and to their confidence levels. This strategy was employed to reduce offset effects of individual pixels by averaging. However, the circuit only worked with high-contrast edges, and even then showed poor performance. This result was mainly due to the discrepancy between the high-precision requirement of the algorithm and the low precision of the analog circuitry.

A sensor array based on the correspondence technique is described by T. Horiuchi, J. Lazzaro, A. Moore and C. Koch, in *A delay line based motion detection chip*, ADVANCES IN NEURAL INFORMATION PROCESSING SYSTEMS 3, 406–12 (Morgan Kaufman 1991). In this approach, within each pixel, a voltage pulse was triggered in response to a quickly-increasing irradiance level, identified as a dark-bright edge. Pulses from adjacent pixels were sent through two delay lines from opposite directions. Their meeting point, as a measure of their relative timing, was the cue used to estimate velocity. Thus, each pair of adjacent pixels provided a 1D velocity vector for each detected edge. The circuit worked robustly down to low irradiance levels and contrasts under D.C. lighting conditions. A.C. incandescent lighting, however, caused spurious edges to be detected at the flicker rate of 120 Hz. This problem could only be alleviated by using additional filtering circuitry. Other drawbacks of the system were the limited detectable velocity range for a given delay setting, and the large area consumption of the delay lines.

A class of chips based on other biologically-inspired correspondence techniques uses elements tuned to have maximum response to a certain velocity. In one dimension, such elements usually determine the direction of non-optimal velocities as well, but they do not unambiguously encode the speed. At least two such cells, tuned to different velocities, must be used to extract the speed. In two dimensions, the direction of non-optimal velocity cannot be determined either; this is because it is interrelated with the magnitude of the velocity components measured along different directions.

For a robust estimate of a single velocity, a population of differently tuned cells is required. Existing systems based on this approach occupy large silicon areas. In addition, such existing systems exhibit a variety of problems. The velocity-response curve of a chip described by R. G. Benson and T. Delbrück, in *Direction Selective Silicon Retina That Uses Null Inhibition*, ADVANCES IN NEURAL INFORMATION PROCESSING SYSTEMS 4, 756–763 (Morgan Kaufman 1991), based on a computational model by H. B. Barlow and W. R. Levick, as described in *The mechanism of directionally selective units in the rabbit's retina*, J.

PHYSIOL vol. 178, pp. 447–504 (1965), was not tunable and decreased at low contrasts. A second approach by R. Sarpeshkar, W. Bair and C. Koch, as described in *Visual Motion Computation in Analog VLSI using Pulses*, ADVANCES IN NEURAL INFORMATION PROCESSING SYSTEMS 5, 781–788 (Morgan Kaufman 1993) was insensitive to low-contrast edges.

Thus, the sensors in existing systems generally provide velocity outputs which are strongly dependent upon image brightness or contrast; or they are inoperable under A.C. incandescent lighting; or they take too much area to implement; or they are optimized to detect particular velocities and do not unambiguously discriminate between non-optimal velocities; or they are very sensitive to parameter settings and do not operate over large ranges.

Accordingly, there is a need for a velocity sensor which robustly and unambiguously encodes the velocity of a moving stimulus over a large range of brightnesses, contrasts and velocities, that is compact and insensitive to offsets and variations in circuit parameters.

BRIEF SUMMARY OF THE INVENTION

An integrated circuit that computes the velocity of a visual stimulus moving between two photoreceptor locations is disclosed. In its most basic version, the circuit comprises two temporal edge detectors with photoreceptors, two pulse-shaping circuits, and one motion circuit on a single silicon chip. Velocity is computed from the signed time delay of the appearance of an image feature at the two photoreceptor locations. Specifically, each temporal edge detector detects a rapid irradiance transient at its photoreceptor location and converts it into a short current spike. This current spike is transformed into two different voltage pulses, a fast pulse and a slowly-decaying pulse, by the pulse-shaping circuit that is coupled to the temporal edge detector. The slowly-decaying voltage pulse produced at one location together with the fast voltage pulse generated at the other location, act as inputs to the motion circuit which generates a signal representative of the speed of motion for one sign or direction of motion. A pair of motion circuits encodes velocity, each motion circuit encoding speed for one of the two opposing directions of motion. The motion circuits are sample-and-hold circuits that use the fast pulse from one location to sample the slowly-decaying pulse from the other location. The individual motion-sensing cells are compact, and are therefore suited for use in dense one-dimensional or two-dimensional imaging arrays. Various embodiments are described.

CONVENTIONS AND DEFINITIONS

The "grounded-substrate convention" is used herein and described below. According to this convention, a transistor drawn without a bubble on its gate refers to a native transistor in the semiconductor substrate, and is called a native transistor. A transistor drawn with a bubble on its gate denotes a transistor in a well, and is known as a well-type transistor. The semiconductor substrate is always tied to a reference potential, referred to as "Ground." In an N-well process, the wells are tied to potentials more positive than Ground and the power supply used in the circuit is more positive than Ground. In a P-well process, the wells are tied to potentials more negative than Ground and the power supply used in the circuit is more negative than Ground. Utilizing this convention, circuits drawn for an N-well process are valid in a P-well process if the signs of all potentials are reversed. This convention ensures that well-substrate junctions are always reverse-biased.

Thus, in an N-well process, well-type transistors are p-channel transistors in the well, native transistors are n-channel transistors in the substrate and all voltages in the circuit are positive. In a P-well process, well-type transistors are n-channel transistors in the well, native transistors are p-channel transistors in the substrate and all voltages in the circuit are negative.

A well-type transistor whose well-terminal connections are not explicitly described is assumed to have its well-terminal connected to the power supply.

DETAILED DESCRIPTION OF THE PREFERRED EMBODIMENT

The present invention involves an elementary sensor for the determination of one-dimensional and two-dimensional velocity in real time. In a preferred embodiment, the elementary sensor comprises photoreceptors and analog electronic circuitry on a single silicon substrate using VLSI technology. Such analog integrated circuits are compact and consume little power. Parallel processing of velocity fields in real time may be accomplished through the construction of arrays from these elementary motion sensors. These sensors are described in detail below.

Figure 1A:
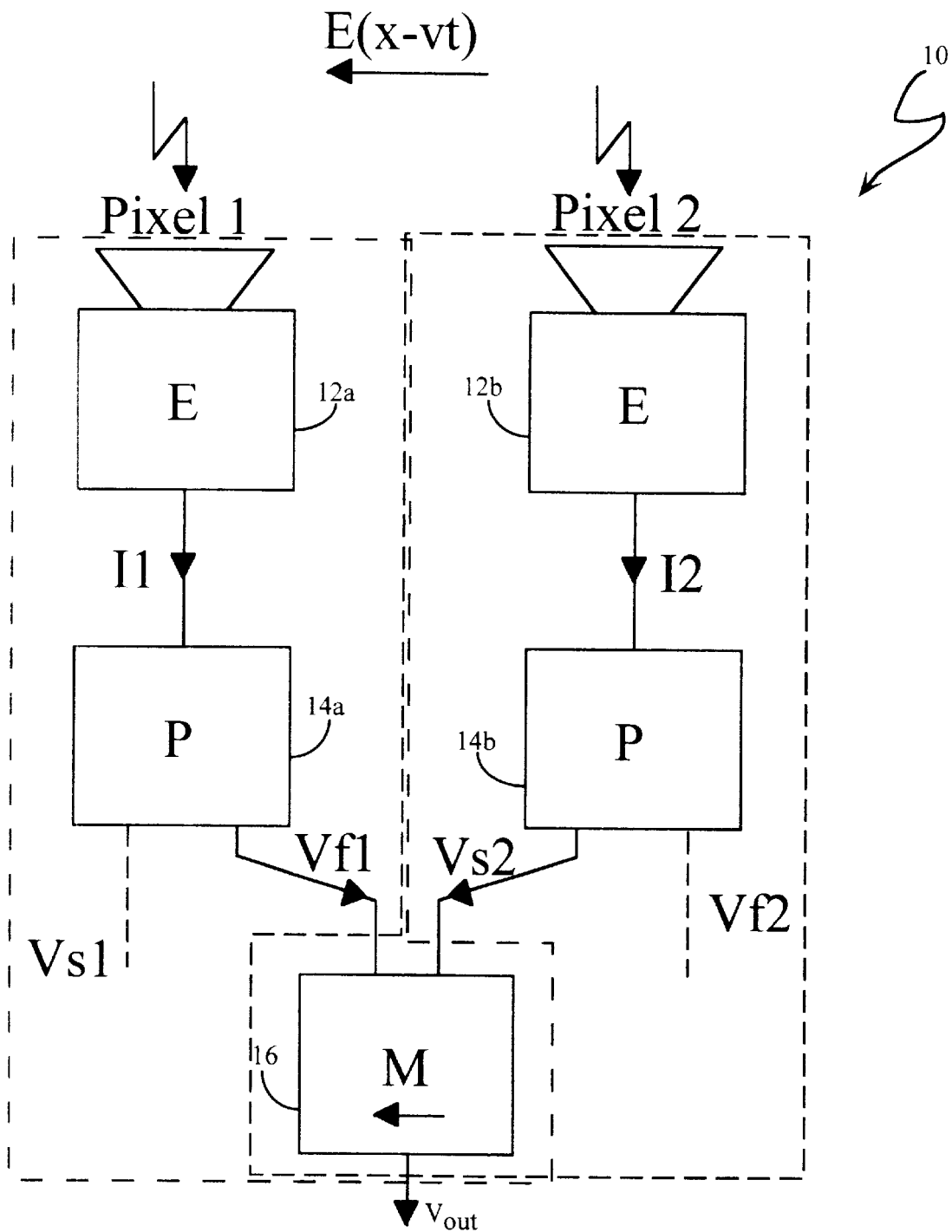
FIG. 1A is a block diagram of the architecture of one preferred embodiment of the motion sensor of the present invention.

FIG. 1A is a block diagram of the architecture of a preferred embodiment of the motion sensor 10 used to determine one-dimensional, uni-directional velocity in real time. The motion sensor 10 comprises two temporal edge detectors 12a, 12b, two pulse-shaping circuits 14a, 14b and a motion circuit 16. The temporal edge detectors 12a, 12b are identical. Similarly, the pulse-shaping circuits 14a, 14b are identical. For discussion purposes, the temporal edge detectors 12a and 12b will be referred to as the temporal edge detector 12. Similarly, the pulse-shaping circuits 14a and 14b will be referred to as the pulse-shaping circuit 14. In a one-dimensional array of motion sensors, each edge detector and pulse-shaping circuit is shared by two adjacent motion circuits, so that the array can be built of cells comprising one edge detector, one pulse-shaping circuit and one motion circuit.

The motion sensor 10 responds to a gradient dE in the image irradiance E moving in one direction of a one-dimensional space, traveling from pixel 2 to pixel 1. The gradient dE may include a particular feature of an image such as an edge or a corner. In operation, each temporal edge detector 12, detects and converts the rapid irradiance transient dE at its location into a short current spike. Each current spike is transformed into two different voltage pulses, a fast pulse $V_f$ and a slowly-decaying pulse $V_s$, by the pulse-shaping circuit 14 coupled to the temporal-edge detector 12, as illustrated in FIG. 1A. In FIG. 1A, the fast and slow pulses corresponding to pixels 1 and 2 are labeled $V_{f1}$, $V_{s1}$ and $V_{f2}$, $V_{s2}$ respectively. Specifically, the pulse-shaping circuit 14a generates a fast pulse $V_{f1}$ and a slowly-decaying pulse $V_{s1}$. Similarly, the pulse-shaping circuit 14b generates a fast pulse $V_{f2}$ and a slowly-decaying pulse $V_{s2}$. In the present embodiment, the slowly-decaying pulse $V_{s2}$ generated by pulse shaping circuit 14b, together with the fast voltage pulse $V_{f1}$ generated by pulse-shaping circuit 14a, are provided to motion circuit 16, which provides an output representative of the velocity of the irradiance gradient traveling from pixel 2 to pixel 1. The slowly-decaying pulse $V_{s1}$ generated by pulse shaping circuit 14a and the fast pulse $V_{f2}$ generated by pulse shaping circuit 14b are not utilized in this embodiment. A detailed description of each circuit will be provided in the following sections.

Figure 1B:
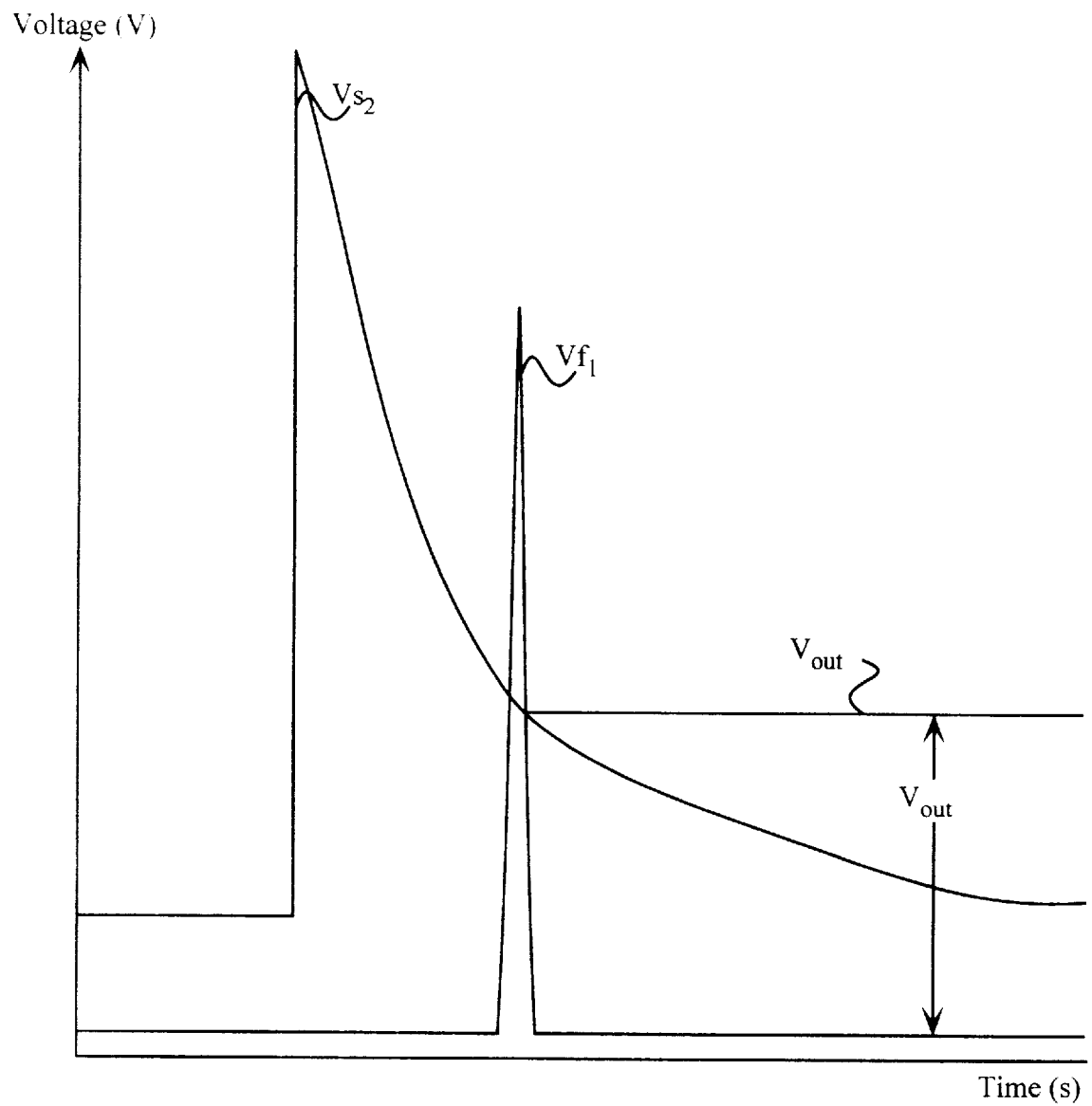
FIG. 1B is a graph illustrating the outputs of the circuits within the motion sensor of FIG. 1A.

FIG. 1B is a graph illustrating the voltage outputs of pulse-shaping circuits 14a, 14b and motion detector 16. The voltage pulse $V_{s2}$ is a slowly-decaying pulse representing the onset and time lapse from the detection of the irradiance transient dE at pixel 2. As will be described in detail in the following sections, $V_{s2}$ is sampled by the motion circuit 16 when $V_{f1}$, a voltage spike, is received by the motion circuit 16. $V_{f1}$ represents the onset of the detection of the irradiance transient dE at pixel 1. The output of the motion circuit 16, $V_{out}$, which represents the time lapse between the detection of the irradiance transient dE at pixel 2 and the detection of the irradiance transient dE at pixel 1, is held at the sampled value, until it is reset by another sampling pulse representing the detection of another irradiance transient. Since the distance between pixel 1 and pixel 2 is a known value, the time lapse thus obtained will facilitate the calculation of the velocity of dE from pixel 2 to pixel 1 through the application of the formula:

velocity=distance/time.

Figure 2:
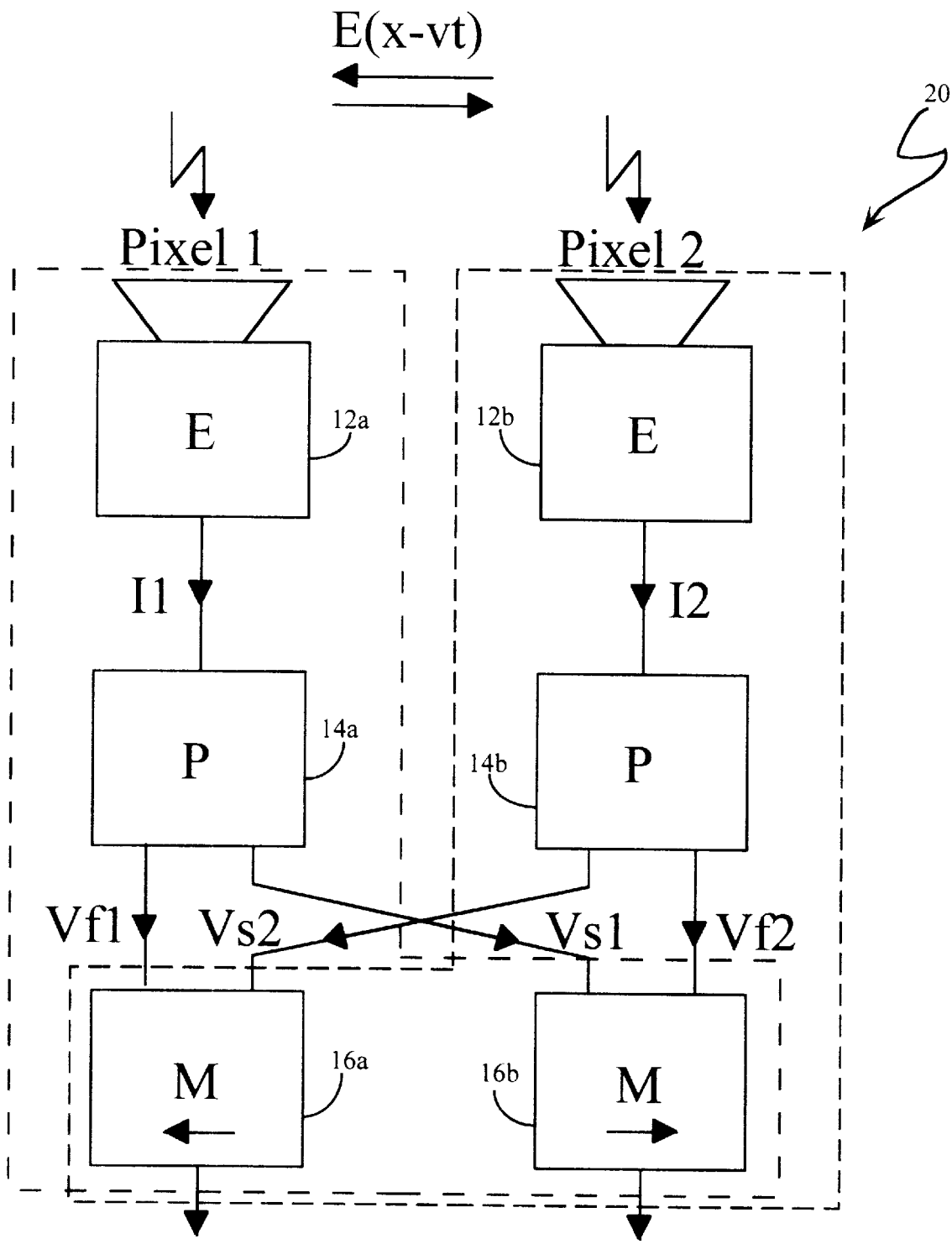
FIG. 2 is a block diagram of the architecture of another preferred embodiment of the motion sensor of the present invention.

FIG. 2 illustrates a block diagram of the architecture of another preferred embodiment of the motion sensor 20 used to determine one-dimensional, bi-directional velocity in real time. The motion sensor 20 comprises a pair of temporal edge detectors 12a, 12b, a pair of pulse shaping circuits 14a, 14b and two motion circuits 16a, 16b. The temporal edge detectors 12a, 12b are identical. Similarly, the pulse shaping circuits 14a, 14b and the motion circuits 16a, 16bare identical. A one-dimensional array of bi-directional motion sensors can be built of cells comprising one edge detector, one pulse-shaping circuit and two motion circuits.

The motion sensor 20 responds to a gradient dE in image irradiance E moving in either direction of a one-dimensional space; that is, an irradiance transient dE which moves from pixel 1 to pixel 2 or vice-versa. As illustrated in FIG. 2, motion circuit 16a responds to an irradiance gradient traveling from pixel 2 to pixel 1, and motion circuit 16b responds to an irradiance gradient traveling from pixel 1 to pixel 2. As with the embodiment illustrated in FIG. 1A, each temporal edge detector 12 detects and converts the rapid irradiance transient dE at its location into a short current spike. Each current spike is transformed into two different voltage pulses, a fast pulse $V_f$ and a slowly-decaying pulse $V_s$ by each pulse-shaping circuit 14 coupled to a temporal edge detector 12. Specifically, the pulse-shaping circuit 14a generates a fast pulse $V_{f1}$ and a slowly-decaying pulse $V_{s1}$. Similarly, the pulse-shaping circuit 14b generates a fast pulse $V_{f2}$ and a slowly-decaying pulse $V_{s2}$. The fast voltage pulse $V_{f1}$ generated by pulse-shaping circuit 14a, together with the slowly-decaying voltage pulse $V_{s2}$ generated by pulse-shaping circuit 14b, are provided to motion circuit 16a, which responds to motion from pixel 2 to pixel 1. The fast voltage pulse $V_{f2}$ from pulse shaping circuit 14b, together with the slowly-decaying voltage pulse $V_{s1}$ from pulse-shaping circuit 14a, are provided to motion circuit 16b, which responds to velocity from pixel 1 to pixel 2. Through the use of the pair of motion circuits 16a and 16b, the circuit 20 may compute the velocity of the irradiance gradient for both directions of motion.

Figure 3:
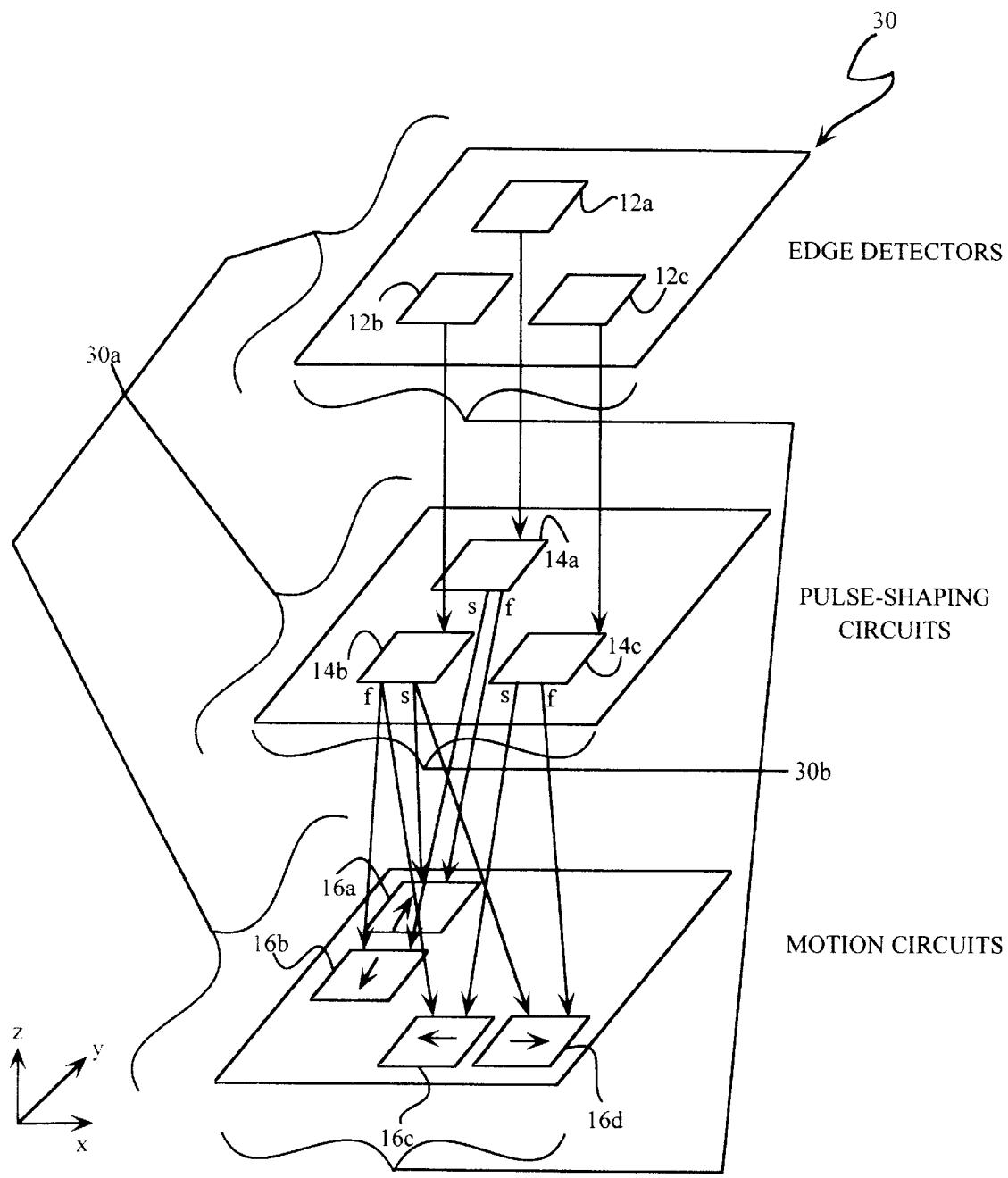
FIG. 3 is a block diagram of the architecture of a further preferred embodiment of the motion sensor of the present invention.

FIG. 3 illustrates a block diagram of the architecture of a further preferred embodiment of the motion sensor 30 used to determine two-dimensional velocity in real time. The two-dimensional motion sensor 30 comprises two one-dimensional motion sensors 30a and 30b, each of which is identical to motion sensor 20. Motion sensor 30a comprises edge detectors 12a, 12b, pulse-shaping circuits 14a, 14b and motion detectors 16a, 16b. Motion sensor 30b comprises edge detectors 12b, 12c, pulse-shaping circuits 14b, 14c and motion circuits 16c and 16d. Note that edge detector 12b and pulse-shaping circuit 14b are shared by the motion sensors 30a and 30b. In this embodiment, the photoreceptors used in each motion sensor all lie in a single plane as illustrated in FIG. 3. The circuitry for processing the detected irradiance transient dE–that is, the remaining circuitry in the edge detectors 12a, 12b, 12c, the pulse-shaping circuits 14a, 14b, 14c and motion circuits 16a, 16b, 16c, 16d may either be external to the photoreceptor plane or lie on the same plane as the photoreceptors. For discussion purposes, an embodiment with the edge detectors 12a, 12b, 12c lying in the photoreceptor plane and the remaining circuitry lying in different planes is described.

For purposes of the following description, a coordinate system is provided having coordinates oriented as follows: the X and Y axes lie in a horizontal plane as shown in FIG. 3. The Z axis is perpendicular to the X and Y axes. The edge detectors 12a–12c, pulse-shaping circuits 14a–14c and the motion circuits 16a–16d are in planes parallel to the horizontal plane. In particular, edge detectors 12a, 12b and 12c lie in a first X-Y plane with edge detectors 12a and 12b oriented along the Y axis and edge detectors 12b and 12c oriented along the X-axis. Similarly, pulse-shaping circuits 14a, 14b and 14c lie in a second X-Y plane parallel to the first X-Y plane, with circuits 14a and 14b oriented along the Y-axis, and circuits 14b and 14c oriented along the X-axis. Motion circuits 16a–16d lie in a third X-Y plane parallel to the first and second X-Y planes, with motion circuits 16a and 16b oriented along the Y-axis and motion circuits 16c and 16d oriented along the X-axis.

The motion sensor 30 facilitates the computation of the velocity of an irradiance gradient moving in two dimensions. Motion sensors 30a and 30b will accurately compute the velocity of an irradiance gradient dE only if it is moving along the Y or X axis, respectively. If the gradient is moving in any other direction, the estimated velocity does not correspond to the correct motion. In particular, if an irradiance gradient oriented at an angle $\Theta$ to the X axis moves at speed v along its direction, the velocities $v'_y$ and $v'_x$ detected by the motion sensors 30a and 30b respectively are:

$$v'_y = \frac{v}{\sin\Theta}$$

$$v'_x = \frac{v}{\cos\Theta}$$

Although a single one-dimensional motion sensor 30a or 30b provides unambiguous encoding of velocity in one dimension, since it provides monotonic response, it does not account for the orientation of motion of the irradiance gradient dE. To uniquely determine orientation and speed, the outputs $v'_y$ and $v'_x$ of the motion sensors 30a and 30b have to be combined. The correct speed v may be expressed as:

$$v = \frac{v'_x \cdot v'_y}{\sqrt{v'^2_x + v'^2_y}},$$

and the correct velocity components $v_x$ and $v_y$ are given by:

$$v_y = v'_y \cdot \frac{v'^2_x}{\sqrt{v'^2_x + v'^2_y}}$$

$$v_x = v'_x \cdot \frac{v'^2_y}{\sqrt{v'^2_x + v'^2_y}}.$$

If the photoreceptor pair within each motion sensor 30a, 30b is separated by the same distance $\Delta d$, the measured velocities $v'_x$ and $v'_y$ are given by:

$$v'_x = \frac{\Delta d}{\Delta t_x} \text{ and } v'_y = \frac{\Delta d}{\Delta t_y},$$

where $\Delta t_y$ and $\Delta t_x$ correspond to the time delays signaled by the two motion sensors 30a, 30b in the y and in the x directions respectively.

Thus, $$v = \frac{\Delta d}{\sqrt{\Delta t_x^2 + \Delta t_y^2}}$$

$$v_y = \frac{\Delta d \cdot \Delta t_y}{\sqrt{\Delta t_x^2 + \Delta t_y^2}}$$

$$v_x = \frac{\Delta d \cdot \Delta t_x}{\sqrt{\Delta t_x^2 + \Delta t_y^2}}.$$

Thus, utilizing the arrangement illustrated in FIG. 3 permits the unambiguous encoding of the velocity of an irradiance gradient dE moving in two-dimensional space, if the direction of motion is parallel to the orientation of the gradient.

TEMPORAL EDGE DETECTOR

Figure 4A:
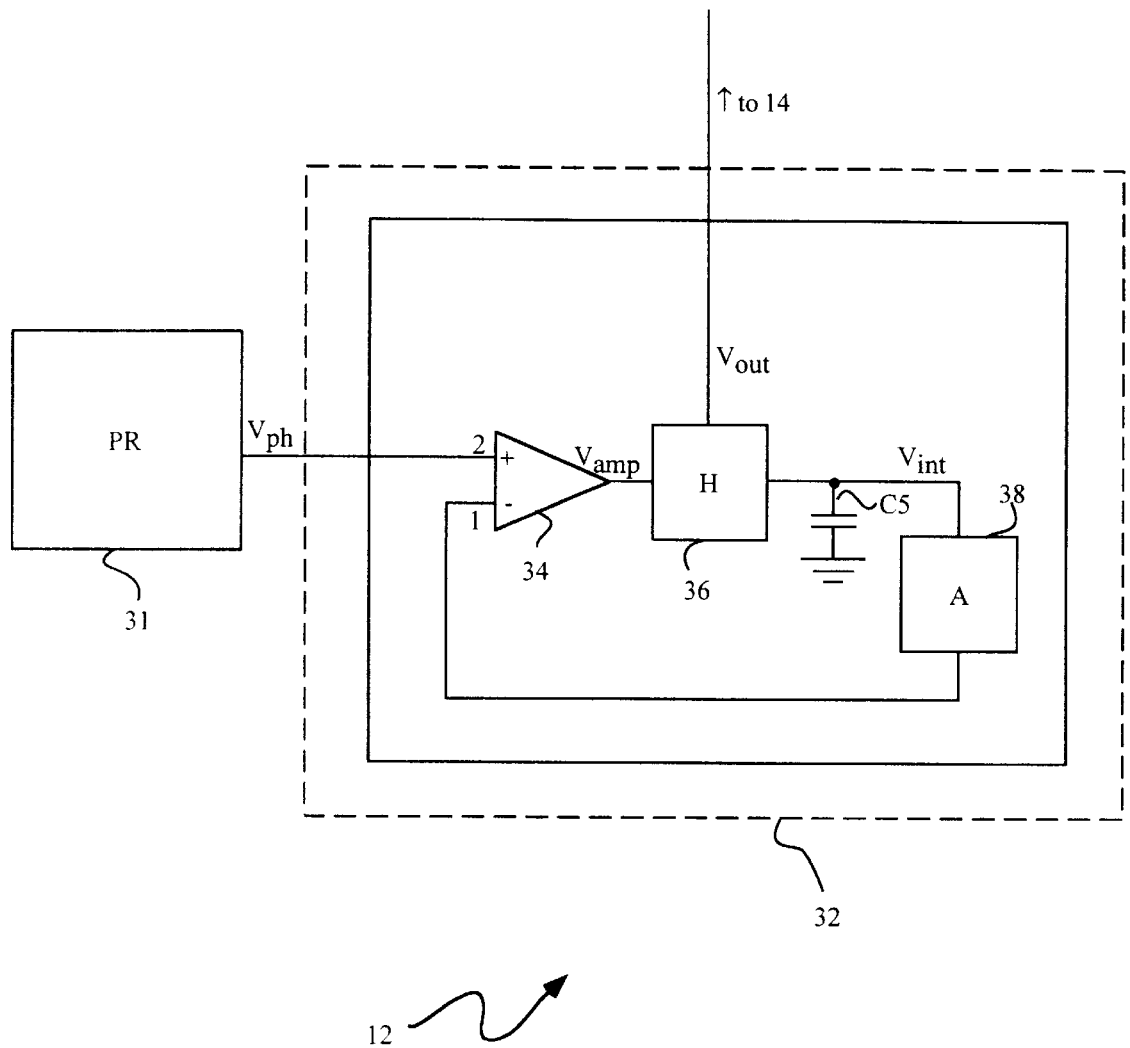
FIG. 4A is a block diagram of a preferred embodiment of the edge detector circuit of the present invention.

The temporal edge detectors 12a, 12b and 12c are identical and, for present purposes, will be referred to as temporal edge detector 12. FIG. 4A illustrates a preferred embodiment of a temporal edge detector 12 of the present invention. The motion sensor 10, 20, 30a or 30buses a pair of temporal edge detectors 12 as an input stage. At each photoreceptor site, a rapid increase in brightness is detected by the temporal edge detector 12 and converted into a short current spike. In a preferred embodiment, the temporal edge detector 12 detects the temporal dark-bright or ON edges of the image traveling from pixel 1 to pixel 2 or vice-versa by sensing voltage changes in the photoreceptor output caused by irradiance increases. In an alternate embodiment, the temporal edge detector 12 detects the bright-dark or OFF edges of the image traveling from pixel 1 to pixel 2 or vice-versa.

The temporal edge detector 12 comprises an adaptive photoreceptor circuit (PR) 31 and an amplifier circuit 32 which is basically an operational amplifier connected to a plurality of transistors and capacitors so that the amplifier is in a non-inverting feedback configuration. In a preferred embodiment, the temporal edge detector 12 of the present invention utilizes the adaptive photoreceptor described in U.S. Pat. No. 5,376,813 (the "Delbrüjick patent"), entitled "Adaptive Photoreceptor including Adaptive Element for Long-Time-Constant Continuous Adaptation with Low Offset and Insensitivity to Light", issued to T. Delbrüjick and C. Mead and assigned to the assignee of the present invention. The Delbrjick patent is incorporated by reference herein. The amplifier circuit 32 comprises an operational amplifier 34, a rectifying circuit (H) 36, a capacitor C5 and an attenuation circuit (A) 38.

Figure 4B:
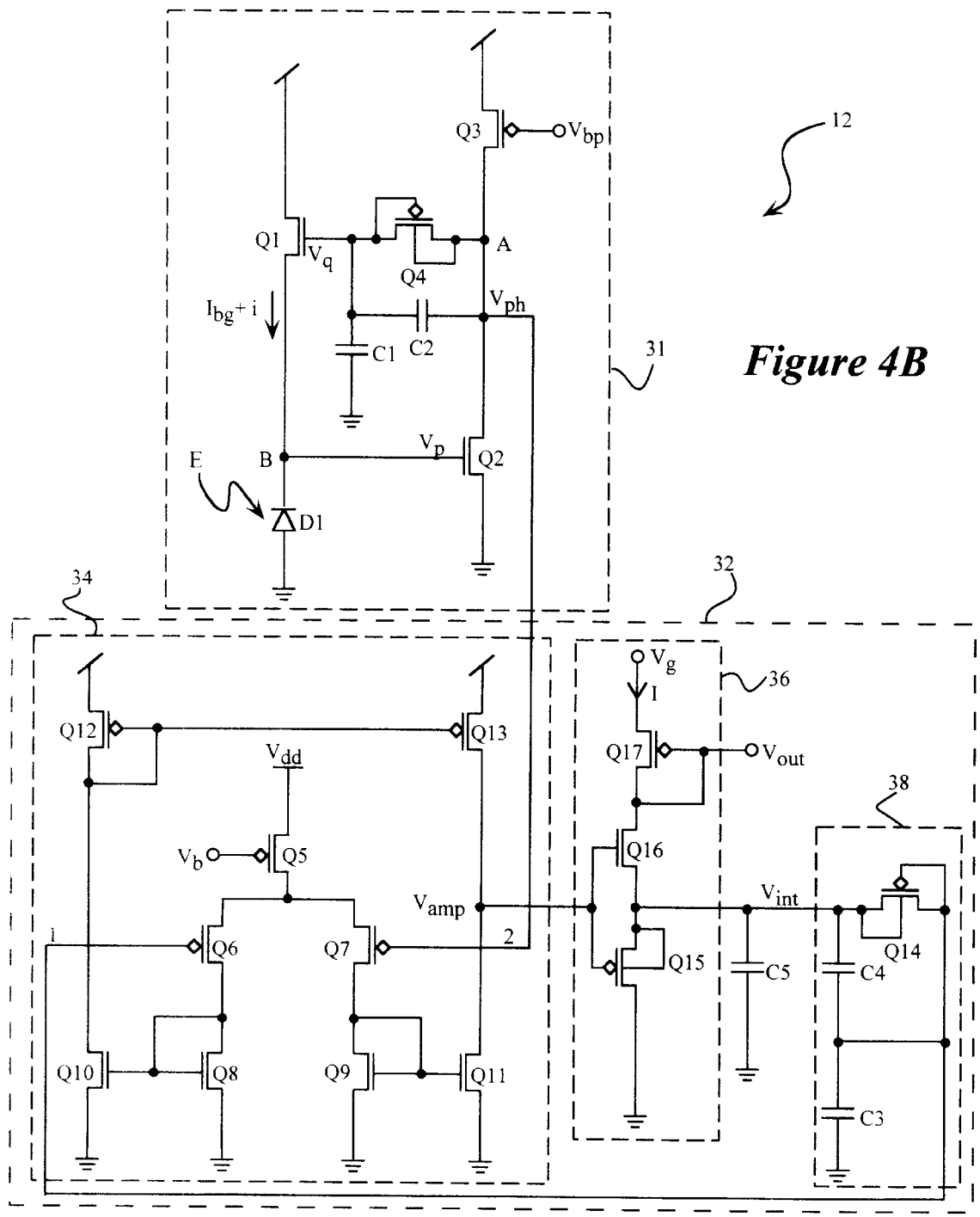
FIG. 4B is a detailed schematic diagram of a preferred embodiment of the edge detector circuit of FIG. 4A.

FIG. 4B is a detailed schematic of one embodiment of the temporal edge detector 12 shown in FIG. 4A. In this preferred embodiment, the photoreceptor circuit 31 comprises photodiode D1, transistors Q1–Q4 and capacitors C1, C2. In a preferred embodiment, Q1 and Q2 are n-channel transistors while Q3 and Q4 are p-channel transistors. However, any other suitable photoreceptor which can detect irradiance changes in the image may be used in the edge detector 12.

The photoreceptor described in the Delbrück patent provides an output voltage transient $dV_{ph}$ based on a comparison of the actual detected irradiance and a predicted irradiance based on an average of previous values of the detected irradiance. The output voltage $V_{ph}$ of the photoreceptor 31 increases logarithmically with the irradiance E of the photodiode D1, as long as the transistors Q1–Q4 operate below threshold. Thus, a transient dE in the image irradiance E causes a voltage transient $dV_{ph}$ that is a function of the contrast $$\frac{dE}{E}.$$

This property is highly desirable for the extraction of local features from an image, because the overall illumination of a typical scene is likely to change with time, and such a response gives a fixed transient output for a given percentage change in irradiance, independent of the current overall brightness of the image.

When there is steady illumination on D1, the bias voltage $V_{bp}$ biases Q3 as a current source, which pulls the voltage of node A up, so as to turn on Q1 through diode-connected Q4, thereby pulling the voltage on node B up. As a result, Q2 starts to turn on until the current passing through Q2 equals the current through Q3, a constant current. Thus, at steady state, the voltage of node B is fixed, i.e., independent of the irradiance E. In the photoreceptor circuit 31, the DC gain is low and the transient gain is high. The transient gain of the photoreceptor is determined by the capacitive divider formed by C1 and C2.

When a sudden increase in illumination is detected by D1, the current of D1 increases proportionally. The operating point of the photoreceptor circuit 31 is set by a previous average value of the irradiance. Thus, the input photocurrent of the photoreceptor circuit 31 at this point comprises a steady-state background component $I_{bg}$ and a varying or transient component i. The transient component i pulls node B down, which reduces the current through Q2. This causes the voltage of node A to increase with high gain, which in turn increases $V_q$ through the capacitive divider formed by C1 and C2. Due to the high gain of this feedback circuit, $V_p$ is held nearly clamped and $V_q$ rises enough to make Q1 provide the extra current i sunk by D1. Consequently, $V_{ph}$ rises rapidly, then slowly adapts towards the voltage $V_q$ as C1 is charged through the adaptive element Q4. For typical irradiances, Q1 operates at subthreshold and thus the voltage $V_q$ increases logarithmically with the irradiance of the photodiode D1.

The current-voltage (I-V) relationship of the adaptive element $Q_4$ is that of a sinh. Consequently, the adaptation is slow for small output voltage steps and fast for large steps. The adapted gain of the photoreceptor circuit 31 is low because the feedback is a short circuit across the adaptive element Q4 and $V_{ph}$ does not have to adjust by a significant amount to cause the necessary current increase through Q1. On short time scales, no charge flows through the adaptive element Q4, but changes in $V_{ph}$ are coupled to $V_q$ through the capacitive divider comprising C1 and C2. Thus, the larger the capacitive divider ratio, the larger $V_{ph}$ will become to move $V_q$ to account for the increased current through Q1 and D1. Thus, the transient gain of the photoreceptor 31 is set by the capacitive-divider ratio.

In subthreshold operation, the transient change $dV_{ph}$ of the photoreceptor output voltage to an irradiance step dE is given by $$dV_{ph} = \left(\frac{kT}{qK}\right)\left(\frac{C_1 + C_2}{C_2}\right)\left(\frac{dE}{E}\right), \quad (1)$$

where $$\frac{kT}{q}$$

is the thermal voltage and K is the back-gate coefficient of $Q_1$.

As depicted in FIGS. 4A and 4B, the output of the photoreceptor 31 is fed into an amplifier circuit 32 that transduces positive voltage excursions in the photoreceptor voltage $V_{ph}$, corresponding to ON edges, to a current. The circuit 32 comprises an operational amplifier 34 with a bias $V_b$, connected to a rectification circuit 36, a capacitor C5, and an attenuation circuit 38 so that the amplifier circuit 32 is in a non-inverting feedback configuration.

In a preferred embodiment, the operational amplifier 34 is a wide-range amplifier comprising transistors $Q_5$–$Q_{13}$. When no irradiance transient is detected by the photoreceptor 31, $dV_{ph}=0$ and the non-inverting and the inverting terminals, nodes 2 and 1, of the operational amplifier 34 are at the same potential. $V_b$ biases $Q_5$ to provide a current source for the differential input stage of the operational amplifier 34, turning on $Q_6$ and $Q_7$ with an equal amount of current. Q8 and Q9 act as current mirrors, mirroring the current passing through $Q_6$ and $Q_7$ to $Q_{10}$ and $Q_{11}$ respectively. The current through $Q_{10}$ is mirrored at $Q_{12}$ to $Q_{13}$. Since the current in $Q_{13}$ is equal to that in $Q_{11}$, the potential at $V_{amp}$ is steady.

When an irradiance transient dE is detected by the photoreceptor 31, $dV_{ph}$ becomes nonzero. In this case, nodes 1 and 2 are not at the same voltage. Specifically, if $dV_{ph}$ is positive, node 2 will temporarily be more positive than node 1. The current passing through $Q_6$ will increase and the current passing through $Q_7$ will decrease. This causes more current to be mirrored by $Q_8$ to $Q_{10}$, resulting in more current being mirrored by $Q_{12}$ to $Q_{13}$. In addition, less current will be mirrored through $Q_9$ to $Q_{11}$. As a result, the current through $Q_{13}$ is greater than the current through $Q_{11}$ and the potential at Vamp will rise sharply.

If the polarity of $dV_{ph}$ is reversed, the potential at node 2 will temporarily be less than the potential at node 1. As a result, more current will pass through $Q_7$ than when nodes 1 and 2 were at the same potential. This increased current is mirrored by $Q_9$ to $Q_{11}$. In addition, less current will pass through $Q_6$, which is mirrored by $Q_8$ to $Q_{10}$. The decreased current will be mirrored by $Q_{12}$ to $Q_{13}$. As a result, the current through $Q_{11}$ will be greater than the current through $Q_{13}$, and the potential at $V_{amp}$ will sharply decrease.

The output of the operational amplifier 34 is provided to the rectification circuit 36, which is in turn coupled to the attenuation circuit 38. The rectification circuit 36 comprises transistors $Q_{15}$, $Q_{16}$ and $Q_{17}$. The attenuation circuit 38 comprises capacitors $C_3$, $C_4$ and an adaptive element $Q_{14}$. The adaptive element $Q_{14}$ is a sinh element, identical to $Q_4$ used in the photoreceptor 31. The adaptive element $Q_{14}$ prevents node 1 of the amplifier 34 from floating by slowly adapting it to $V_{int}$. The capacitors $C_3$, $C_4$ form a capacitive divider that causes the transient gain at $V_{int}$ in the amplifier circuit 32 to be $$\frac{C_3 + C_4}{C_4}$$

with respect to the input voltage change $dV_{ph}$ of the amplifier 34.

Figure 4C:
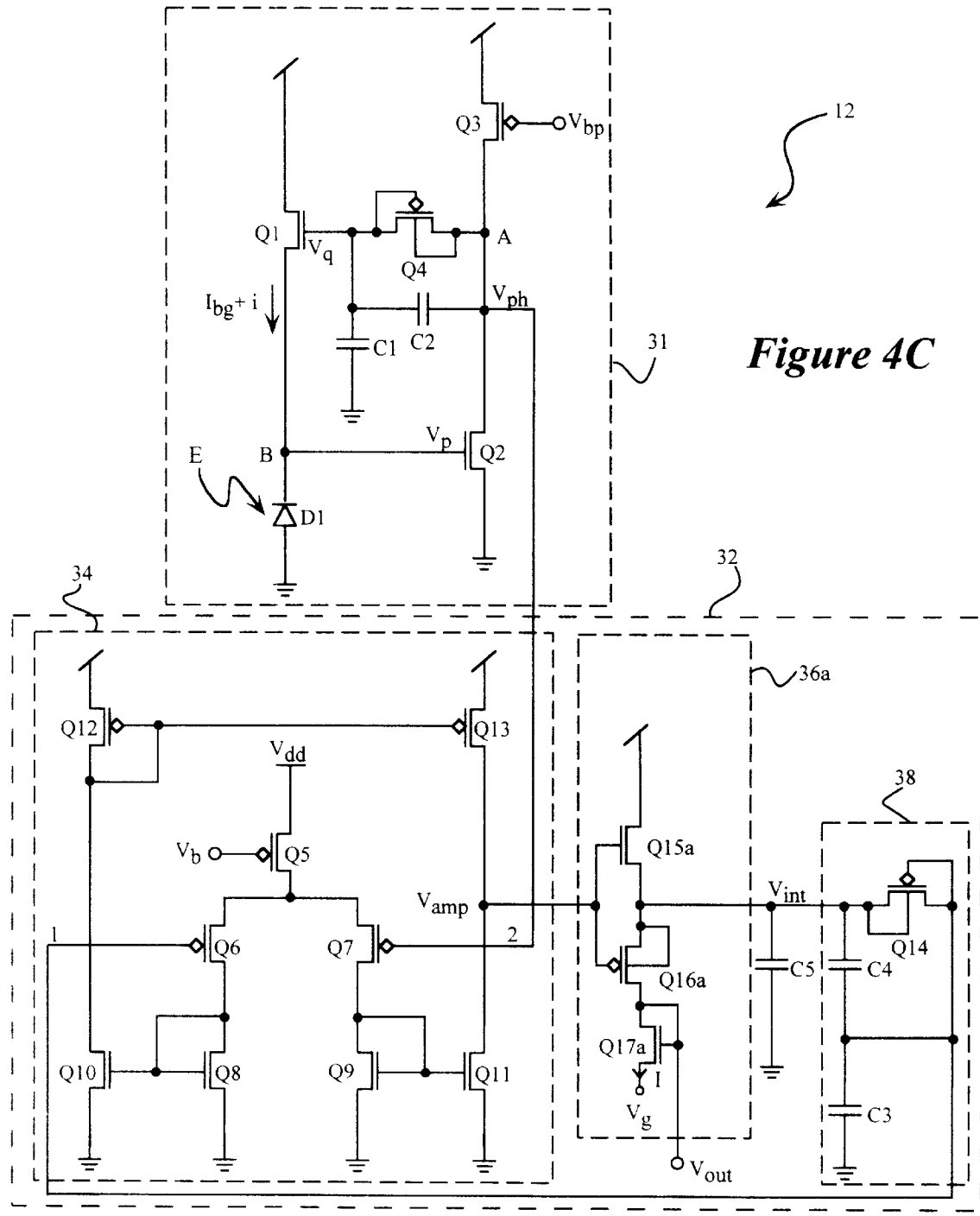
FIG. 4C is a detailed schematic diagram of an alternate embodiment of the edge detector circuit of FIG. 4A.

The current I charging the node $V_{int}$ is given by $$I = \frac{C_{tot} dV_{int}}{dt}, \quad (2)$$

where $$C_{tot} = C_5 + \left(\frac{C_3 C_4}{C_3 + C_4}\right),$$

provided that $Q_{14}$ is only weakly turned on. This current is supplied by $Q_{16}$ if it is positive and by $Q_{15}$ if it is negative. Thus, if the current through each of these transistors is sensed separately, a half-wave rectified version of the changing current I may be constructed. In this preferred embodiment, the positive part of I is sensed by sensing the current through $Q_{16}$ with the diode-connected $Q_{17}$. The voltage $V_{out}$ on the gate of $Q_{17}$ may be used to mirror copies of the current through $Q_{16}$ to succeeding circuits. The voltage $V_g$, which provides a bias for $Q_{17}$, may be used to set the gain of this output mirror if it is operated within a few mV of $V_{DD}$. Note that the transistor $Q_{15}$ is source-connected to minimize body-effects, since the D.C. voltages of operation are around 1.5V. Also note that FIG. 4C is a detailed schematic diagram of an alternate embodiment of the edge detector circuit of FIG. 4A. Specifically, FIG. 4C illustrates one implementation of the rectifying circuit 36a where Q15a and Q17a are native transistors and Q16a is a well-type transistor.

Substituting equation (1) into equation (2) provides an output current of $$I = C_{tot}\left(\frac{C_3 + C_4}{C_4}\right)\left(\frac{C_1 + C_2}{C_2}\right)\left(\frac{kT}{qK}\right)\left(\frac{dE}{Edt}\right).$$

The output current is therefore proportional to the temporal contrast $$\left(\frac{dE}{Edt}\right),$$

where the temporal contrast is the product of the velocity V and the spatial contrast $$\left(\frac{dE}{Edx}\right):$$

$$\left(\frac{dE}{Edt}\right) = v\left(\frac{dE}{Edx}\right).$$

Thus, the amplifier circuit 32 senses a voltage change $$\frac{dV_{ph}}{dt}$$

in the photoreceptor 31 output caused by a detected temporal contrast $$\frac{dE}{Edt}$$

and serves to convert the sensed voltage change into a current I linearly proportional to the detected temporal contrast by amplifying, differentiating, and rectifying the received signal $$\frac{dV_{ph}}{dt}.$$

PULSE-SHAPING CIRCUIT

Figure 5A:
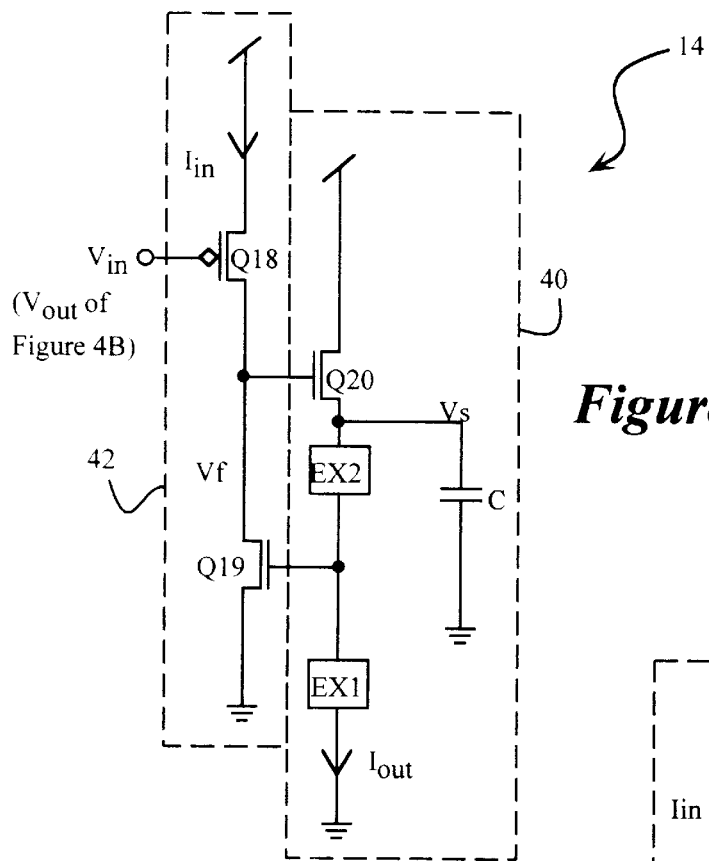
FIG. 5A is a schematic diagram of one embodiment of the pulse-shaping circuit of the present invention.
Figure 5B:
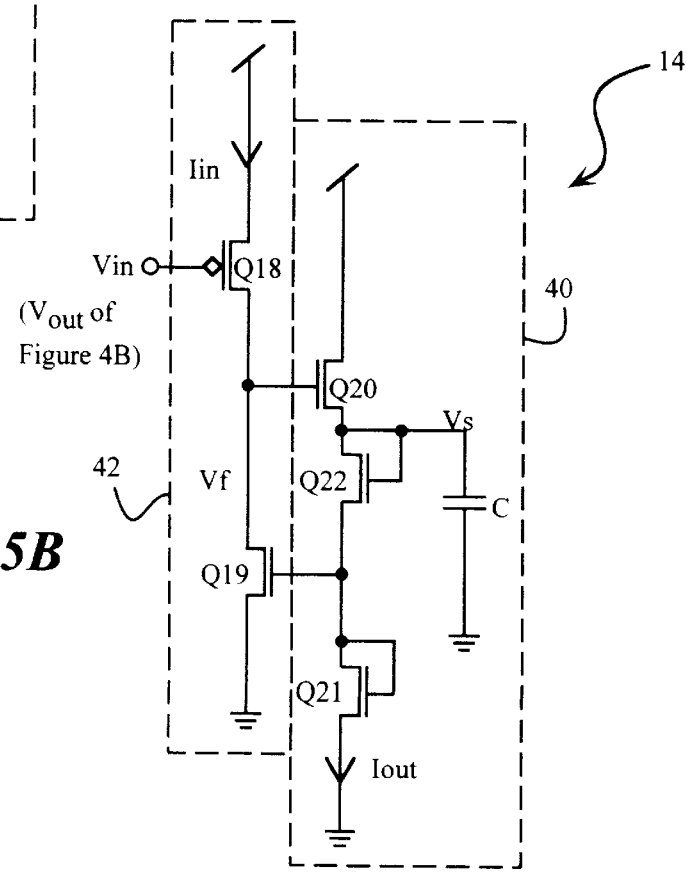
FIG. 5B is a schematic diagram of a preferred embodiment of the pulse-shaping circuit of FIG. 5A.

As described earlier, the pulse-shaping circuits 14a, 14b and 14c are identical. For present purposes, each pulse shaping circuit 14a, 14b and 14c will be referred to as a pulse-shaping circuit 14. FIG. 5A is a schematic diagram of one embodiment of the pulse shaping circuit 14 of the present invention. This preferred embodiment of circuit 14 is a non-linear differentiator comprising a low-pass filter 40 in the feedback path of a high-gain amplifier 42. The high gain amplifier 42 comprises transistors $Q_{18}$ and $Q_{19}$ and the low pass filter 40 comprises transistor $Q_{20}$, exponential elements EX1, EX2 and capacitor C. FIG. 5B is a schematic diagram of a preferred embodiment of the pulse-shaping circuit of FIG. 5A. In this preferred embodiment, exponential element EX1 is a native transistor $Q_{21}$ in diode configuration and exponential element EX2 is an identical native transistor $Q_{22}$, in diode configuration. Note that each exponential element can be implemented differently, for example, as a npn bipolar transistor in diode configuration.

The input to the circuit 14 is a current $I_{in}$, obtained from the mirror constructed by connecting the output voltage of the edge detector 12 ($V_{out}$ in FIG. 4B) to $V_{in}$, of circuit 14. The voltage $V_f$ responds to an input current spike $I_{in}$, mirrored from the edge detector 12, with a voltage spike. The voltage $V_s$ responds to the same spike with a pulse having a sharp onset and a log(t)-like decay. The input $I_{in}$ may be thought of as an impulse that sets the initial condition on the diode-capacitor subcircuit of $Q_{21}$, $Q_{22}$, and C. It may be shown that, for an initial condition with a spike height of $I_o$, the diode-capacitor current $I_{out}$ is given by $$I_{out}(t) = \frac{I_o}{1 + \frac{I_o t}{CV_K}}, \quad (3)$$

where $$V_K = \frac{kT(K+1)}{qK^2},$$

and K is the back-gate coefficient of $Q_{21}$ and $Q_{22}$.

Specifically, $I_{in}$ is a current spike which turns on $Q_{18}$, pulling the voltage $V_f$ up and turning on $Q_{20}$. This causes capacitor C to be charged rapidly by the current through $Q_{20}$. As C charges up, the drain voltage of $Q_{21}$ increases, thereby turning on $Q_{19}$ until its current balances the current flowing through $Q_{18}$. When the input-current spike ceases, the voltage $V_f$ falls abruptly because the current through $Q_{19}$ is now greater than that through $Q_{18}$ and $Q_{20}$ is turned off. The capacitor C then discharges through $Q_{22}$ and $Q_{21}$, resulting in a slow decay of voltage $V_s$.

Figure 5C:
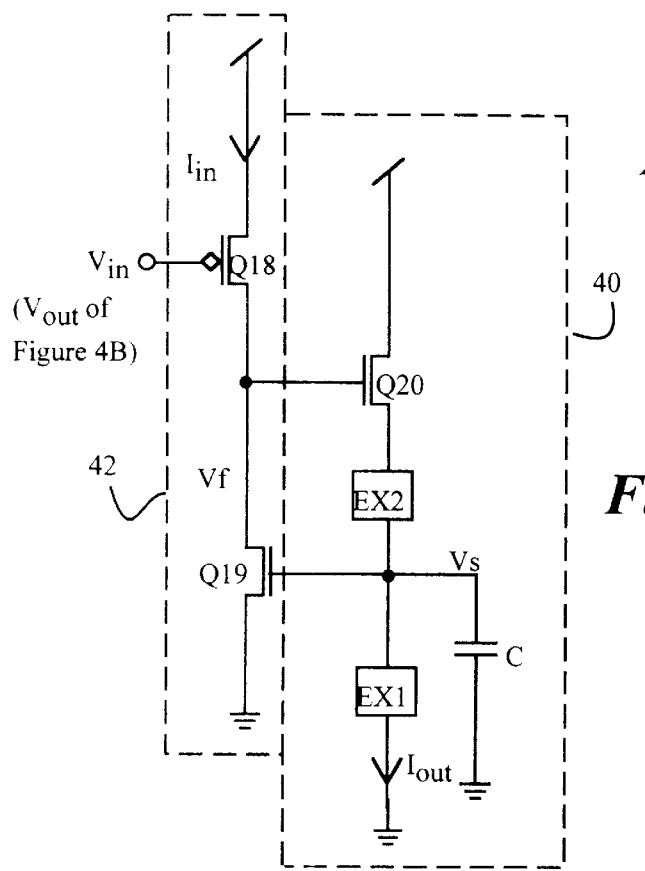
FIG. 5C is a schematic diagram of a second embodiment of the pulse-shaping circuit of the present invention.

FIG. 5C is a schematic diagram of a second embodiment of the pulse-shaping circuit of the present invention. The circuit 14 of FIG. 5C is substantially identical to the circuit of FIG. 5A, with the exception that the capacitor C is coupled to the gate of $Q_{19}$ instead of being coupled to the source of $Q_{20}$.

Figure 5D:
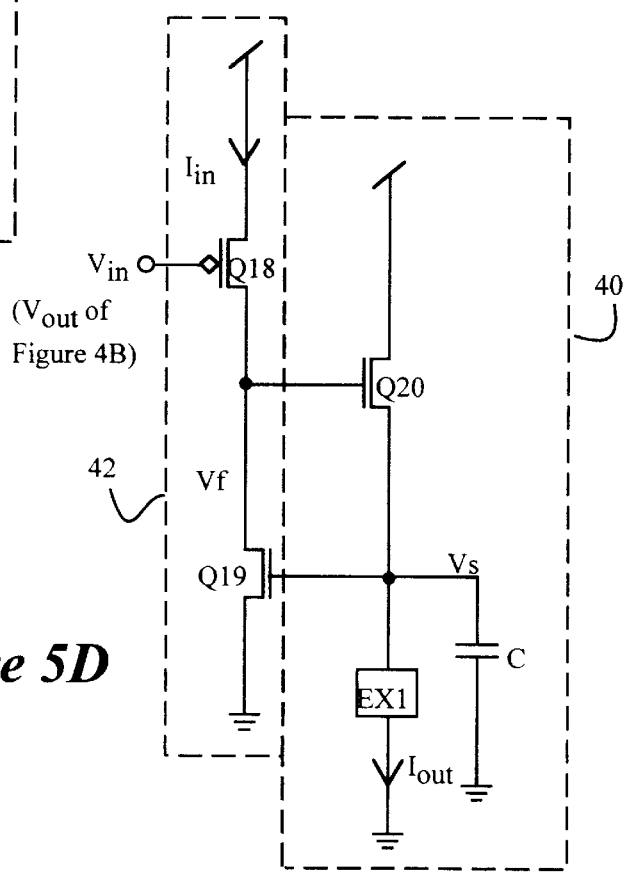
FIG. 5D is a schematic diagram of a third embodiment of the pulse-shaping circuit of the present invention.

FIG. 5D is a schematic diagram of a third embodiment of the pulse-shaping circuit of the present invention. The circuit of FIG. 5D is substantially identical to the circuit of FIG. 5A, with the exception that exponential element EX2 is not utilized in the circuit of FIG. 5D, so that the source of $Q_{20}$ is connected directly to the exponential element EX1.

Figure 6A:
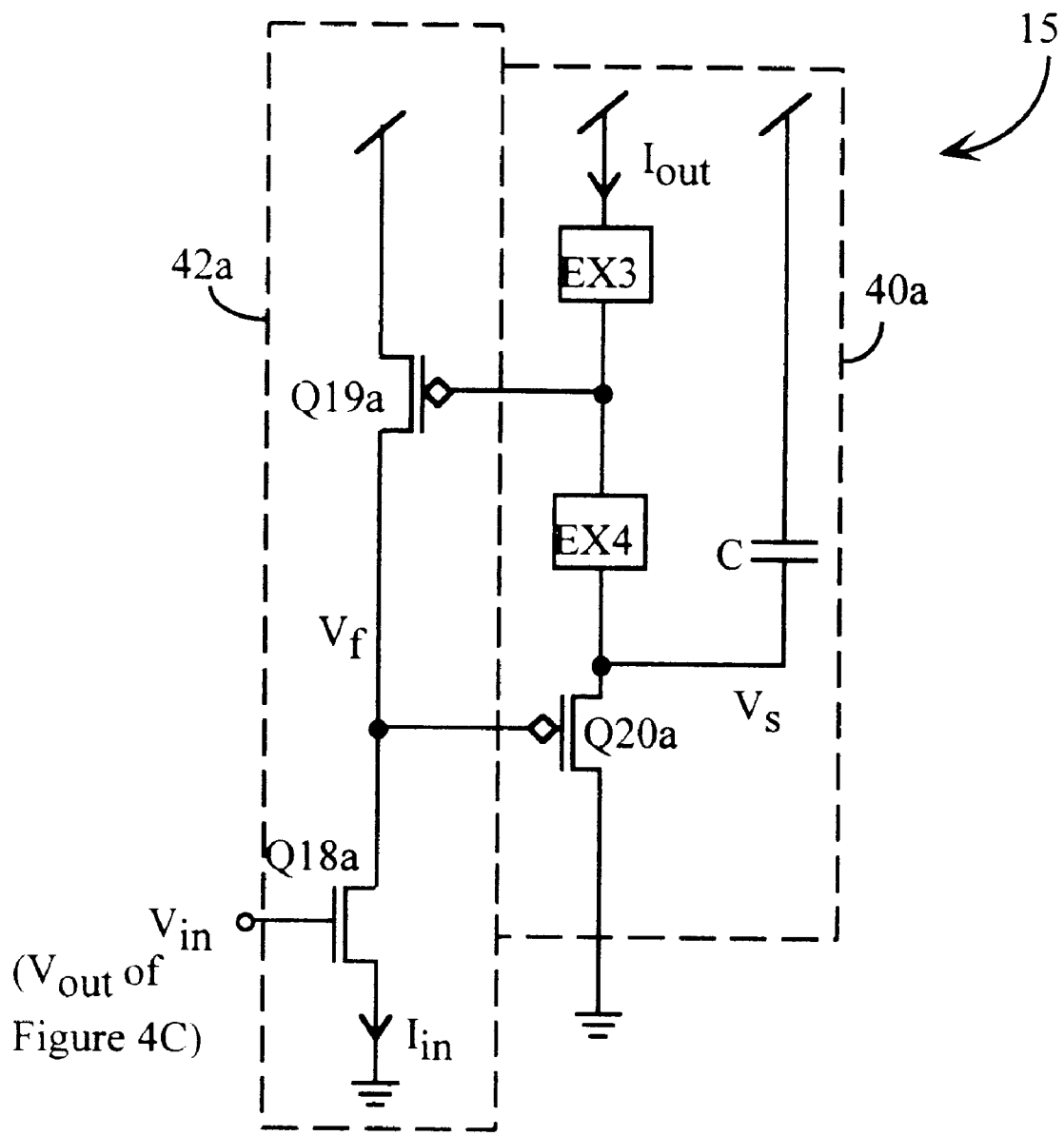
FIG. 6A is a schematic diagram of a fourth embodiment of the pulse-shaping circuit of the present invention.
Figure 6B:
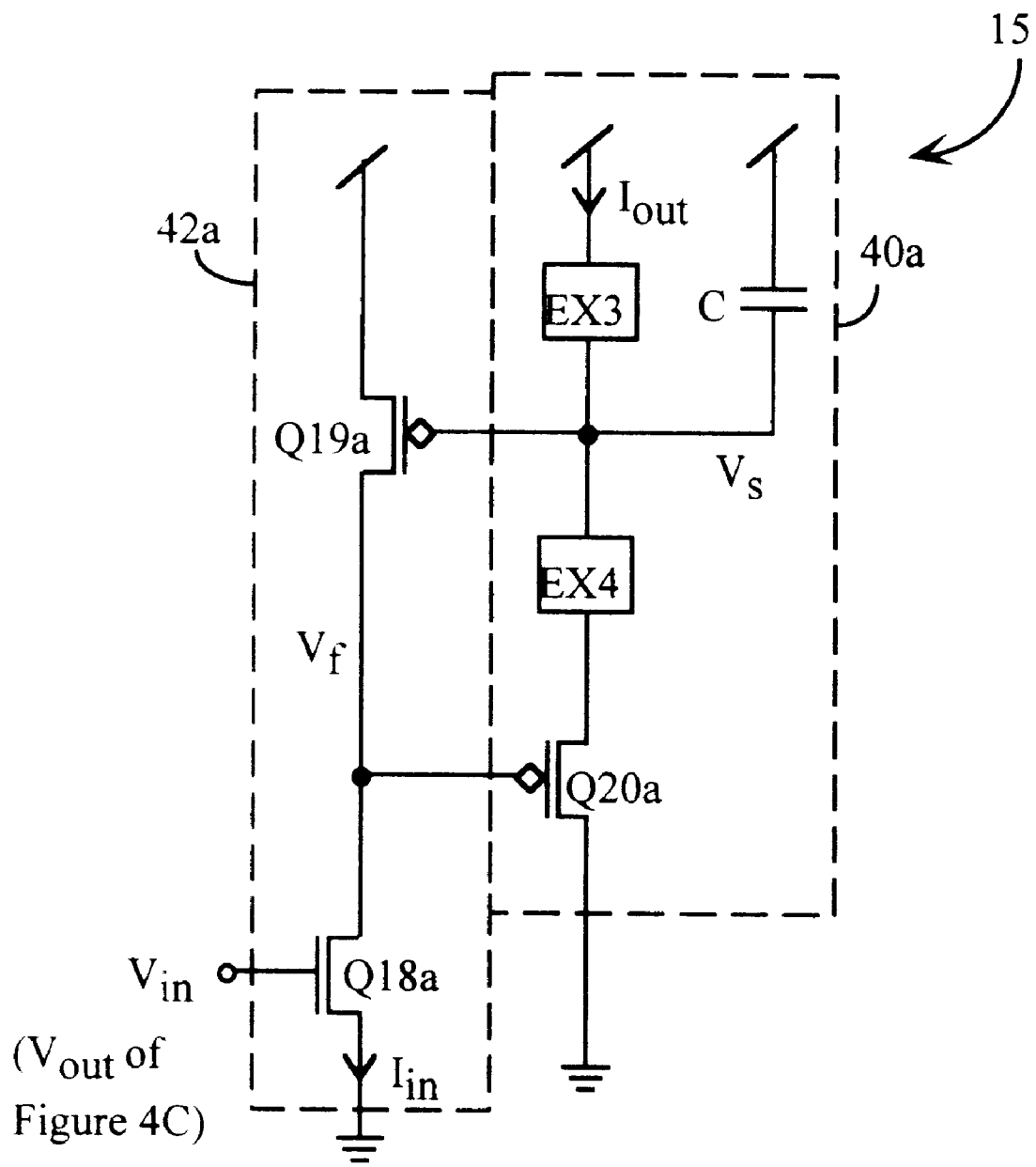
FIG. 6B is a schematic diagram of a fifth embodiment of the pulse-shaping circuit of the present invention.
Figure 6C:
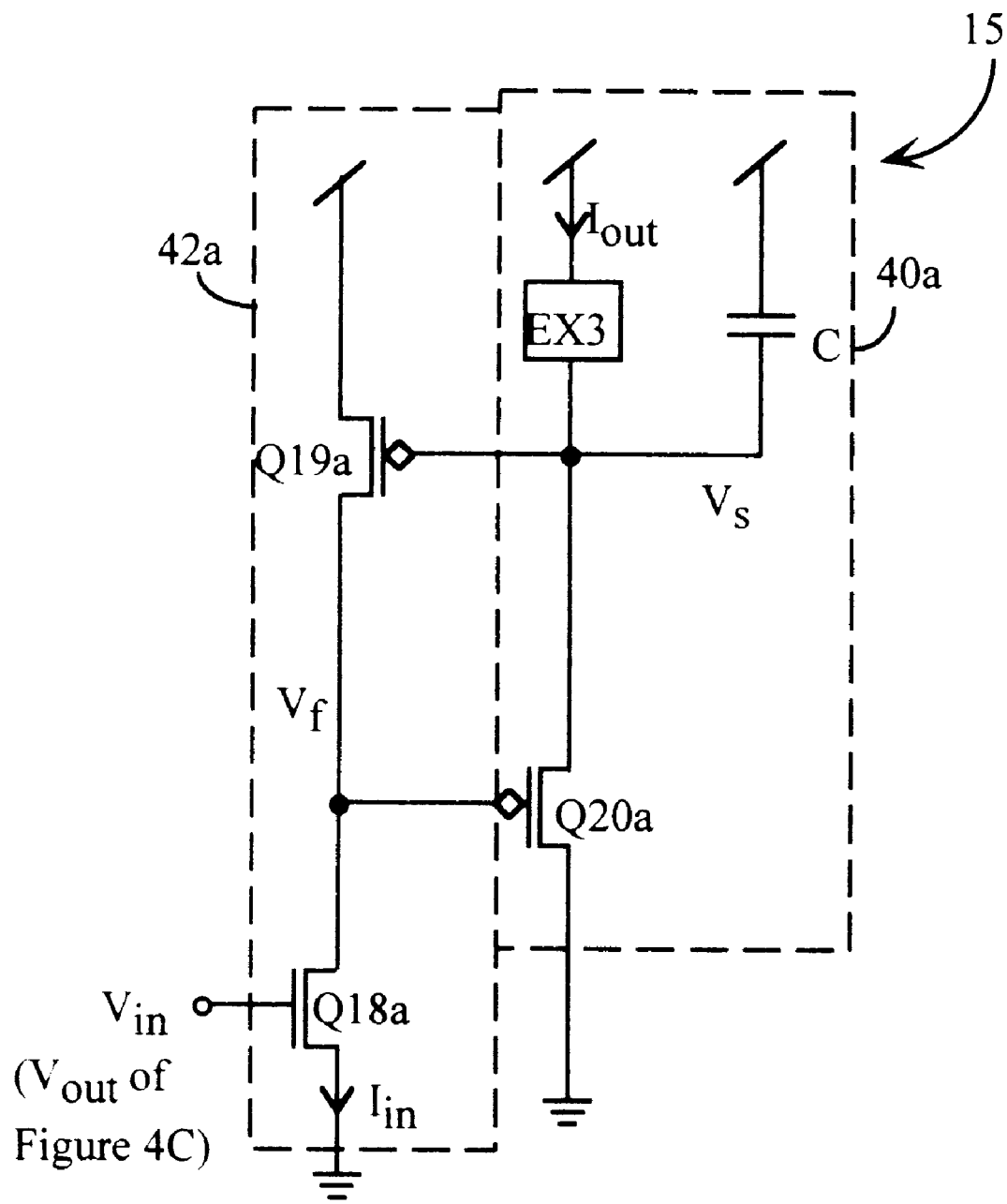
FIG. 6C is a schematic diagram of a sixth embodiment of the pulse-shaping circuit of the present invention.

FIGS. 6A–6C are schematic diagrams of a fourth, a fifth and a sixth embodiment respectively, of the pulse-shaping circuit of the present invention. The circuit 15 illustrated in FIGS. 6A–6C correspond to the circuit 14 illustrated in FIGS. 5A, 5C and 5D, respectively, but native and well-type transistors are exchanged, $V_{DD}$ and Ground are exchanged and different exponential elements EX3 and EX4 are used. In a preferred embodiment, each exponential element is either a well-type MOSFET in diode configuration or a pnp bipolar transistor in diode configuration. The input voltage $V_{in}$ of circuit 15 is the output voltage $V_{out}$ of the embodiment of edge detector 12 depicted in FIG. 4C.

Figure 7:
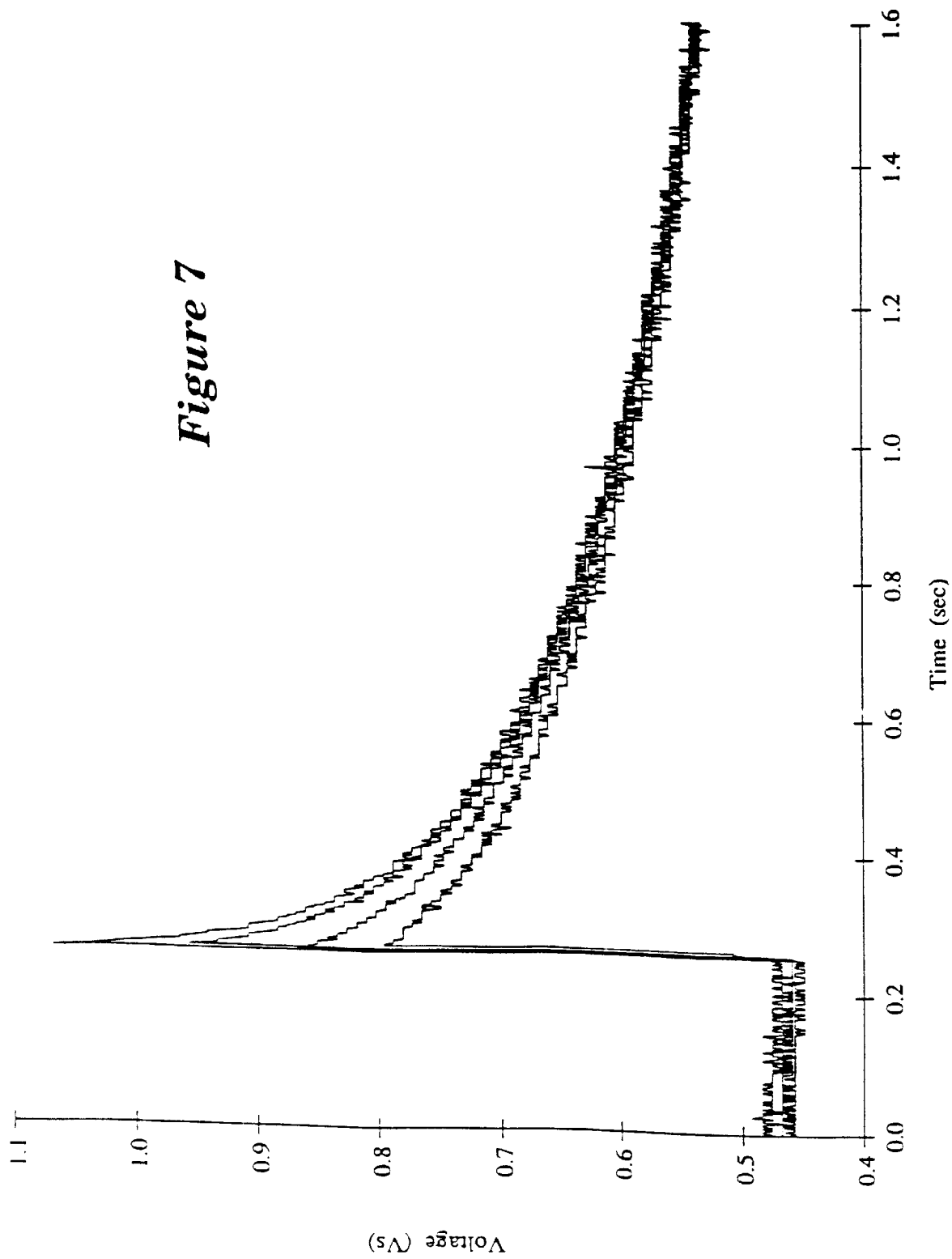
FIG. 7 is a graphical representation of the slowly-decaying output voltage $V_s$ of the pulse-shaping circuit of the present invention for a variety of edge contrasts.

Note that the circuit 14 or 15 has no explicit time constant, determined by a bias voltage, that sets the dynamics of the diode-capacitor decay. Instead, it exploits the fact that a diode-capacitor configuration intrinsically adapts to time constants over many orders of magnitude. After a sufficiently long time t, such that $I_o t >> CV_K$, $I_{out}(t)$ is approximately equal to $CV_K/t$ as seen from equation (3), and $V_s(t)$ is approximately proportional to $V_K \log(t)$. This means that $I_{out}$ and $V_s$ are independent of $I_o$. Because $I_{out}$ and $V_s$ are independent of $I_o$ if it is sufficiently large, i.e., if the input temporal contrast dE/Edt is sufficiently large, the shape of $V_s(t)$ becomes invariant to input contrast level at times when it will be sampled. This can be seen from FIG. 7, which depicts $V_s(t)$ in response to edges of four different contrasts. Thus, the sample-and-hold motion circuits, to be described later, that have $V_s(t)$ as their input report velocities that do not change with input contrast so long as it is sufficiently large. This contrast-independence is achieved without any explicit digital thresholding, as in several other schemes, because of the use of the graceful analog properties of the circuit. Also, because of the intensity-independent encoding of the photoreceptor, the outputs are independent of light level as well.

MOTION CIRCUITS

Figure 8:
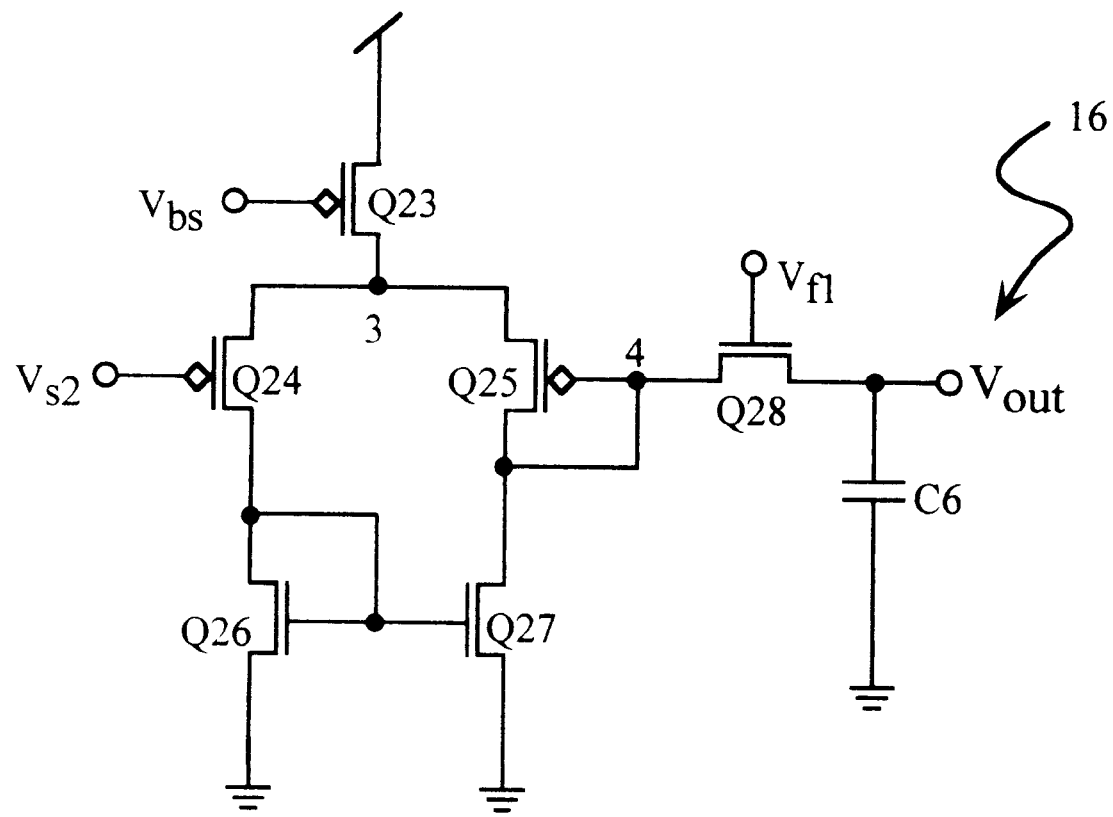
FIG. 8 is a schematic diagram of a preferred embodiment of the motion circuit used in the motion sensor of the present invention.

FIG. 8 depicts a schematic diagram of a preferred embodiment of the motion circuit 16 of the present invention. To compute the velocity of an irradiance gradient dE, the analog voltage of the slowly-decaying pulse $V_s$ that the irradiance gradient dE initiates at one pixel is sampled by the voltage spike $V_f$ triggered by the detection of the same irradiance gradient dE at an adjacent pixel. Since the $V_s$ pulse facilitates the measurement, this technique is termed facilitate-and-sample (FS). The monotonic decay of the facilitation pulse ensures unambiguous encoding of speed in the sampled voltage. For the determination of a signed velocity component (i.e., the velocity in two opposite directions), two sample-and-hold circuits are necessary; this is so because each circuit can only determine speed for the direction of motion where the $V_s$ pulse is initiated before the $V_f$ spike. This direction is called the preferred direction.

For example, if dE travels from pixel 2 to pixel 1 (see FIG. 1A), pulse-shaping circuit 14b generates $V_{s2}$ when the photodiode D1 in edge detector 12b senses dE at pixel 2. Pulse-shaping circuit 14a generates $V_{f1}$ when the photodiode in edge detector 12a senses the arrival of dE at pixel 1. The output voltage $V_{out}$ of motion circuit 16 is then representative of the speed of dE. In the other direction, called the null direction (i.e., from pixel 1 to pixel 2 for motion circuit 16), the sampling pulse precedes the facilitation pulse and the voltage of the facilitation pulse triggered by the previous edge is sampled. The latter voltage is normally low unless edges arrive in quick succession. Pulse-shaping circuits 14a, 14b also generate $V_{s1}$ and $V_{f2}$ respectively, which are intended for use by motion circuit 16b (see FIG. 2) for measuring the speed of dE, when dE travels from pixel 1 to pixel 2.

Specifically, in FIG. 8, $V_{bs}$ biases $Q_{23}$ to provide a current source for the motion circuit 16. The current through $Q_{23}$ divides at node 3 and at steady state passes equally through $Q_{24}$ and $Q_{25}$. $Q_{26}$ mirrors the current through $Q_{24}$ to $Q_{27}$. Since the current through $Q_{25}$ is equal to the current through $Q_{27}$ and thus through $Q_{26}$ and $Q_{24}$, the voltage on the gate of $Q_{25}$ is equal to that on the gate of $Q_{24}$. Thus, the voltage $V_{s2}$ on the gate of $Q_{24}$ is effectively copied to node 4 by the buffer comprised of transistors $Q_{23}$–$Q_{27}$.

When $V_{f1}$ is provided to the motion circuit 16, $Q_{28}$ turns on and $V_{f1}$ effectively samples $V_{s2}$ a period of time after $V_{s2}$ is provided to the motion circuit 16. This results in an output voltage $V_{out}$ that is equal to the amplitude of $V_{s2}$ at the sampling time, and specifically, at the time dE is detected at pixel 1.

Motion circuits 16a, 16b, 16c, and 16d are identical. However, the motion circuit 16a responds to motion from pixel 2 to pixel 1 in FIG. 2 and the motion circuit 16b responds to motion from pixel 1 to pixel 2. With reference to FIG. 2, motion circuit 16a receives $V_{s2}$ from pulse-shaping circuit 14b located at pixel 2 and $V_{f1}$ from pulse-shaping circuit 14a located at pixel 1. In contrast, motion circuit 16b receives $V_{s1}$ from pulse-shaping circuit 14a located at pixel 1 and $V_{f2}$ from pulse shaping circuit 14b located at pixel 2. Similarly, motion circuit 16c receives the slowly-decaying pulse from pulse-shaping circuit 14c and the fast pulse from pulse-shaping circuit 14b, and motion circuit 16d receives the slowly-decaying pulse from pulse-shaping circuit 14b and the fast pulse from pulse-shaping circuit 14c.

The motion circuits 16a–16d (referred to in general as motion circuit 16) respond down to arbitrarily slow speeds, while showing good sensitivity at high speeds. Under the assumption that $$\frac{I_o \Delta d}{v} >> CV_K$$

>>$CV_K$ where $\Delta d$ is the pixel spacing, the sampled output voltage $V_{out}$ is independent of $I_o$, and is proportional to $V_K \log$ $$V_K \log\left(\frac{\Delta d}{v}\right).$$

The sensitivity $$\frac{dV_{out}}{dv}$$

is highest at slow speeds, decaying with $v^{-1}$. A single element in a one-dimensional array of motion sensors consisting of a temporal edge detector, a pulse-shaping circuit, and two motion circuits comprises 34 transistors, if it uses the preferred embodiments shown in FIG. 4B, FIG. 5B and FIG. 8.

EXPERIMENTAL RESULTS

Figure 9:
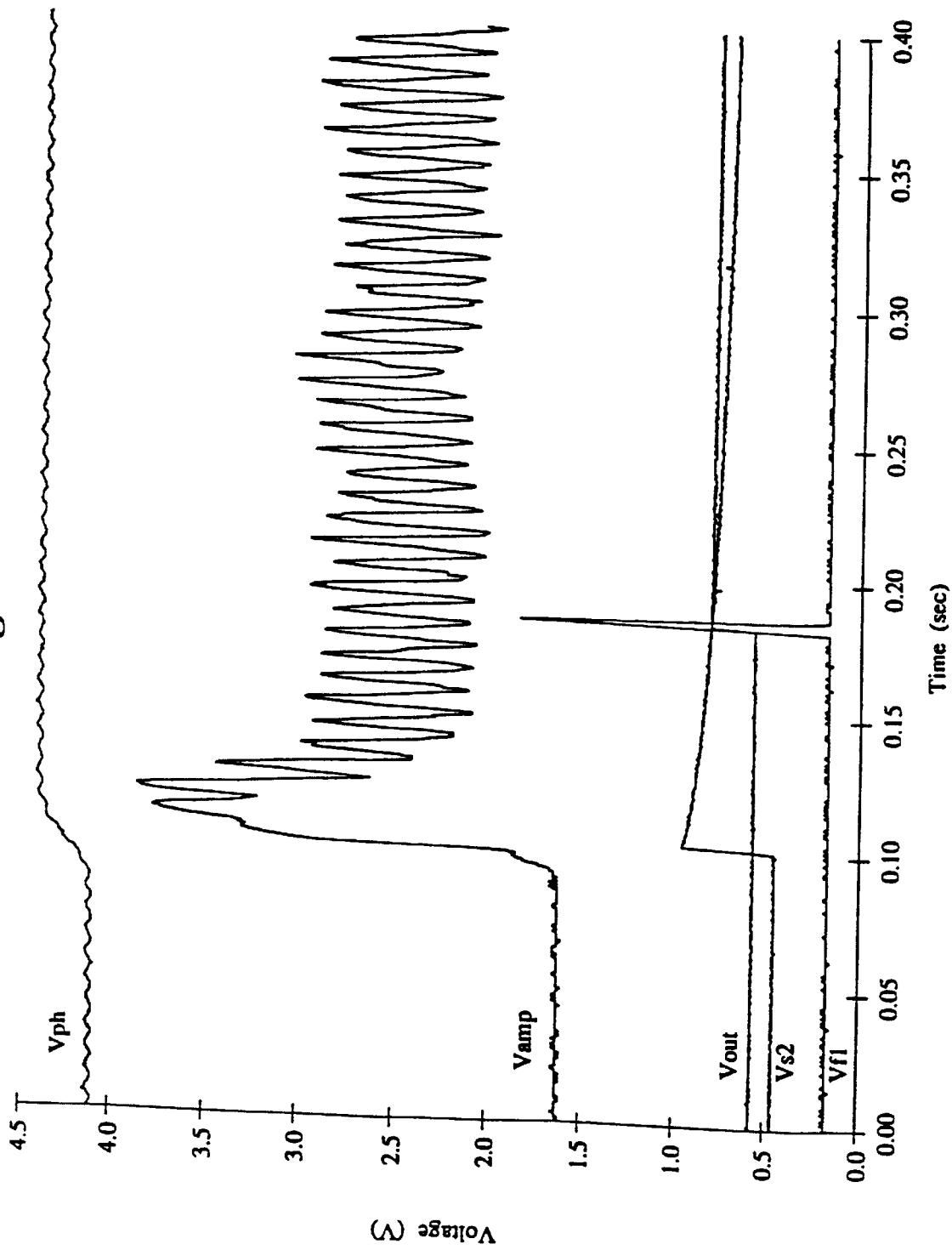
FIG. 9 is a graphical representation of the outputs of the different stages of the different circuits in the motion sensor of the present invention.

A motion sensor 20 was fabricated using a 2 μm n-well CMOS process. A single element in a one-dimensional array of such motion sensors covers an area of 0.05 mm². The imaging lens used for circuit testing has a focal length f=13 mm and an f-number of 1.8. For quantitative measurements, sheets of paper with printed gray scale patterns were wrapped around a rotating drum to provide the optical stimuli. The object distance was set to 380 mm. Measurements were taken under incandescent room lighting conditions, where a white paper surface provided an illuminance of about 1.2 lux on the circuit plane. FIG. 9 shows the response of the different stages of the circuit to a black moving bar on a white background. The 120 Hz flicker noise is seen on the output voltage trace $V_{amp}$ of the wide-range amplifier (FIG. 4B). The bias of the operational amplifier $V_b$ was set at low gain so that the flicker noise remained tolerable. With the bar moving from pixel 2 to pixel 1, $V_{s2}$ is first generated followed by $V_{f1}$, and the output voltage $V_{out}$ is obtained by sampling $V_{s2}$ when $V_{f1}$ is triggered.

Figure 10:
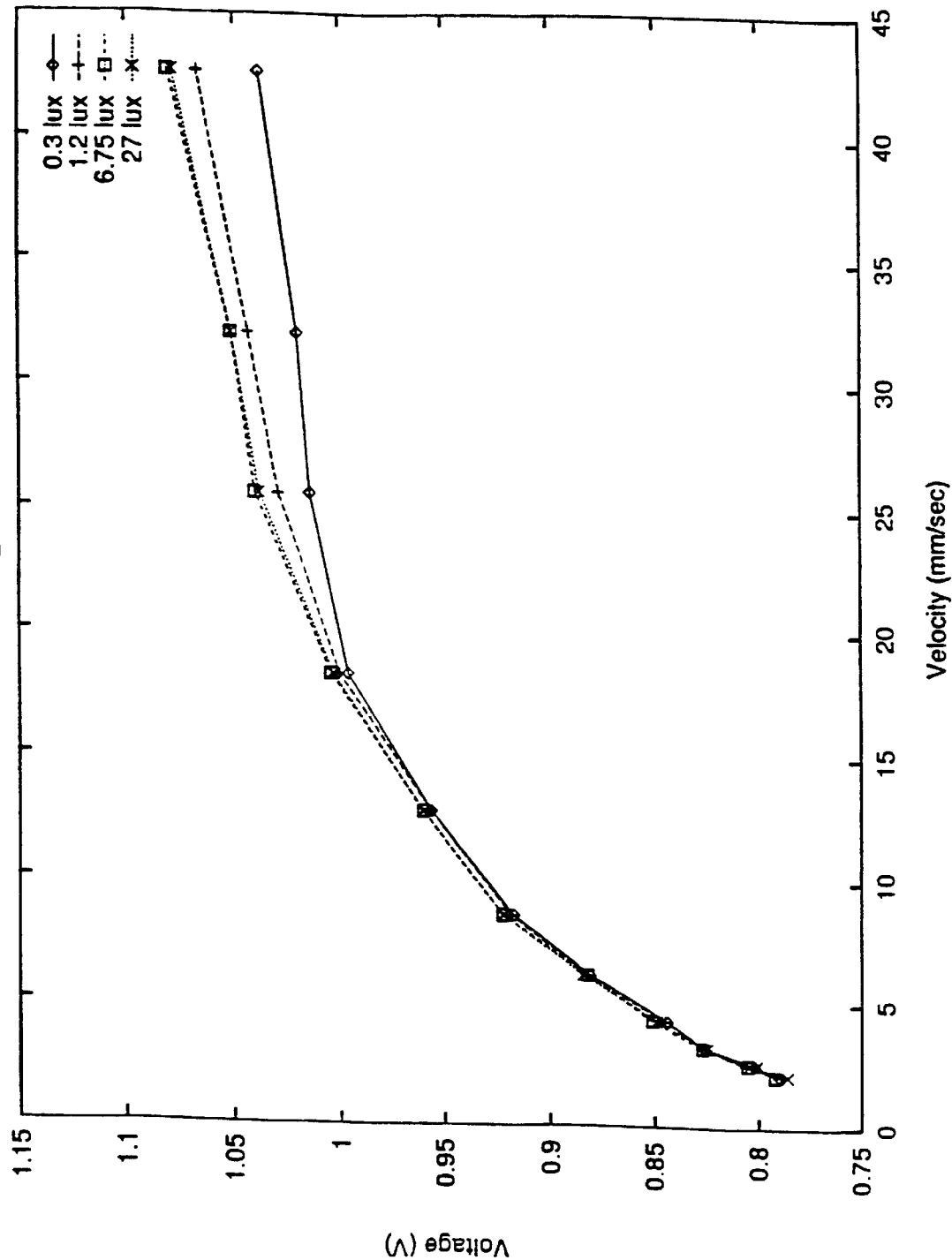
FIG. 10 is a graphical representation of the output voltage of the motion sensor of the present invention with respect to velocity for a variety of illumination levels.
Figure 11:
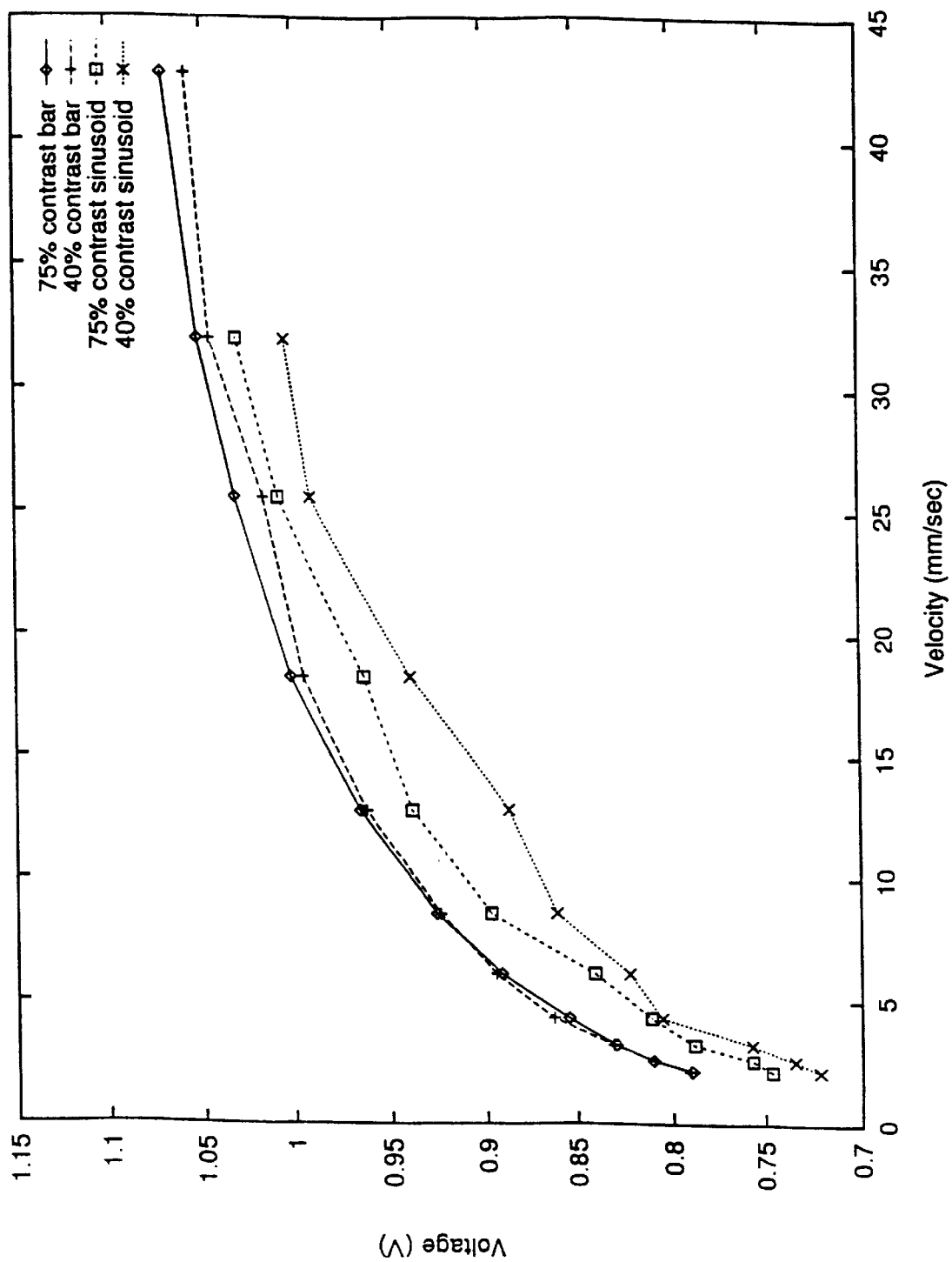
FIG. 11 is a graphical representation of the output voltage of the motion sensor of the present invention with respect to velocity for a variety of stimulus types.

The response curves for the preferred direction at different global illumination levels are shown in FIG. 10. The proximity of the curves to each other is a result of the good contrast encoding of the photoreceptor. Robust operation was observed down to very dim room illumination levels. In FIG. 11, the effect of using different edge sharpnesses and contrasts under standard room lighting conditions is shown. The decrease of the response at relatively high contrasts is due to the fact that the input stage had to be operated at low gain in order to suppress 120 Hz flicker noise. Experiments with D.C. illumination show that a 40% contrast sinusoidal stimulus can be made to yield almost the same response as a 100% contrast bar stimulus for sufficiently slow speeds.

Figure 12:
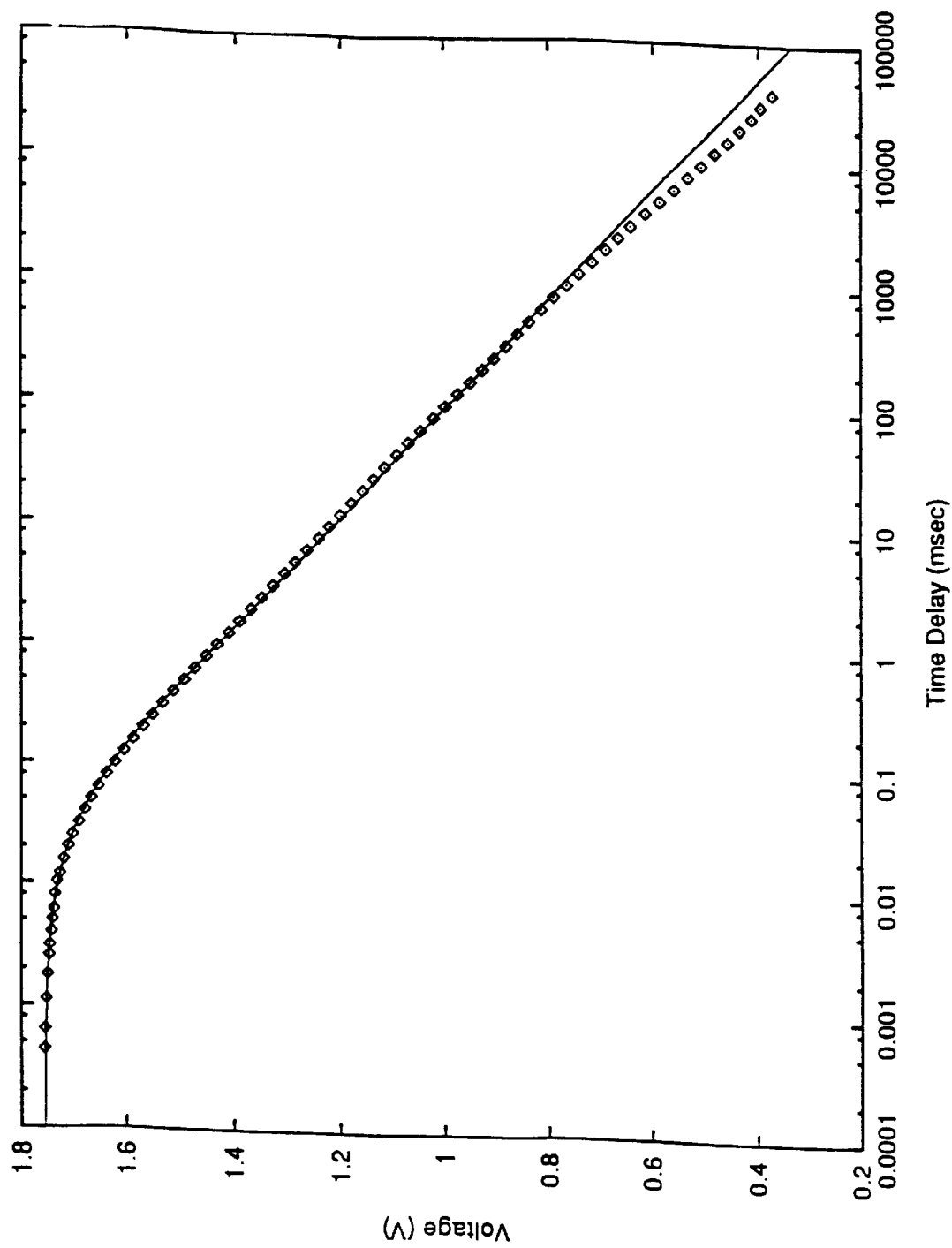
FIG. 12 is a graphical representation of the output voltage of the motion sensor of the present invention with respect to the relative time delay of two voltage pulses presented at the inputs of the pulse-shaping circuits of FIG. 1A.

FIG. 12 shows the response of the motion circuit if the pulse-shaping circuits receive normalized, electronically generated voltage pulses as inputs ($V_{in}$ in FIG. 5B) instead of the output pulses of the edge detectors. The output voltage is plotted as a function of the relative time delay between two pulses applied to adjacent pulse-shaping circuits. Note that the time axis is on a log scale. For such ideal inputs, the logarithmic dependence of the output signal on the relative time delay is approximately maintained for time delays spanning six orders of magnitude. Monotonic dependence of output voltage on time delay is observed over eight orders of magnitude.

Thus, it can be observed that the motion circuit of the present invention provides a velocity output that is independent of the brightness and contrast of the image over considerable ranges. The motion circuit of the present invention can also unambiguously encode the velocity of a moving stimulus. In addition, the motion circuit operates robustly over large speed ranges and is also more compact, and responds to lower contrasts than other known implementations.

Modifications and variations of the embodiments described above may be made by those skilled in the art while remaining within the true scope and spirit of this invention. Thus, although the present invention has been described in terms of certain preferred embodiments, other embodiments that will be apparent to those of ordinary skill in the art are also within the scope of this invention. Accordingly, the scope of the invention is intended to be defined only by the claims which follow.

What is claimed is:

1. A circuit for determining the velocity of an image feature moving between a first and a second position, and between a first and a third position, comprising:

a first circuit having first, second and third sensors, the first and second sensors being located on a first axis, the first and third sensors being located on a second axis, the first, second and third sensors for detecting the image feature in an image having a contrast in the first position, the second position and the third position, respectively, the first circuit generating a first signal, a second signal and a third signal in response to the detection of the image feature in the first position, the second position and the third positions, respectively; and a second circuit for converting the first signal to a fourth signal, the fourth signal being representative of the time lapse starting from the detection of the image feature at the first position, the second circuit generating a fifth signal in response to the second and fourth signals and a sixth signal in response to the third and fourth signals, the fifth signal being representative of the velocity of the image feature moving from the first position to the second position, and the sixth signal being representative of the velocity of the image feature moving from the first position to the third position, the fifth and sixth signals being independent of the contrast of the image.

2. The circuit of claim 1, wherein the image feature is an edge of an image.

3. The circuit of claim 1, wherein the image feature is a corner of an image.

4. The circuit of claim 1 wherein the fourth signal is a slowing-decaying signal.

5. The circuit of claim 1 wherein the fifth signal corresponds to the fourth signal sampled at an instant when the second signal is generated.

6. The circuit of claim 1 wherein the sixth signal corresponds to the fourth signal sampled at an instant when the third signal is generated.

* * * * *